US012736866B2

(12) United States Patent
Hsu

(10) Patent No.: US 12,736,866 B2
(45) Date of Patent: Sep. 15, 2026

(54) OPTICAL DIFFUSION ASSEMBLY, OPTICAL DIFFUSION ELEMENT AND PROJECTION DEVICE

(71) Applicant: Coretronic Corporation, Hsin-Chu (TW)

(72) Inventor: Pi-Tsung Hsu, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 302 days.

(21) Appl. No.: 18/657,663

(22) Filed: May 7, 2024

(65) Prior Publication Data

US 2024/0377716 A1 Nov. 14, 2024

(30) Foreign Application Priority Data

May 9, 2023 (CN) ......................... 202310512796.8

(51) Int. Cl.

*G03B 21/28* (2006.01)
*G02B 5/02* (2006.01)
*G03B 21/20* (2006.01)

(52) U.S. Cl.

CPC ......... *G03B 21/208* (2013.01); *G02B 5/0278* (2013.01)

(58) Field of Classification Search

CPC ............................ G03B 21/208; G02B 5/0278
See application file for complete search history.

(56) References Cited

U.S. PATENT DOCUMENTS 11,662,654 B2 5/2023 Lin et al.
2008/0187012 A1* 8/2008 Yamauchi .............. G02B 1/118 348/E9.027
2016/0067931 A1* 3/2016 Yang ........................ B26D 3/06 428/156
2019/0353997 A1* 11/2019 Hsu ...................... H04N 9/3161
2022/0043330 A1* 2/2022 Kawasumi ............. G03B 33/08
2022/0187694 A1* 6/2022 Lin .................... G03B 21/2066

FOREIGN PATENT DOCUMENTS

CN 209746344 12/2019
TW I676075 11/2019
TW I684820 2/2020
WO WO-2016125824 A1 * 8/2016 ............... G09F 9/00

* cited by examiner

*Primary Examiner* — Bao-Luan Q Le
(74) *Attorney, Agent, or Firm* — JCIPRNET

(57) ABSTRACT

An optical diffusion assembly includes a first optical body and a second optical body. The light beam sequentially passes through the first optical body and the second optical body. The first optical body has a first surface and a second surface opposite to each other. The second optical body has a third surface and a fourth surface opposite to each other. The first surface or the third surface has a first diffusion region. The fourth surface has a second diffusion region. The first diffusion region and the second diffusion region are located on a central optical axis of the light beam. A first part of the light beam sequentially passes through the first diffusion region and the second diffusion region. A second part of the light beam passes through the first diffusion region and does not pass through the second diffusion region.

22 Claims, 18 Drawing Sheets

OPTICAL DIFFUSION ASSEMBLY, OPTICAL DIFFUSION ELEMENT AND PROJECTION DEVICE

CROSS-REFERENCE TO RELATED APPLICATION

This application claims the priority benefit of China application serial no. 202310512796.8 filed on May 9, 2023. The entirety of the above-mentioned patent application is hereby incorporated by reference herein and made a part of this specification.

BACKGROUND

Technical Field

The disclosure relates to an optical element and an optical device, and particularly relates to an optical diffusion assembly, an optical diffusion element, and a projection device.

Description of Related Art

In a projection device of the prior art, in order to smoothly uniformize light energy of a laser light source to reduce excessive concentration of energy at a central position, a condensing lens is usually placed at a location before the laser light source enters a diffusion wheel or a diffusion plate, and a main function thereof is to concentrate the light energy into a light uniformizing element, so as to facilitate uniformizing and shaping of a laser beam by the light uniformizing element. However, when the laser beam enters the diffusion wheel or the diffusion plate, the laser beam is incident at a variety of different angles, resulting in different energy distributions of the laser beam at different positions, so that a diffusion degree of each part of the laser beam is different, resulting in a fact that even if there is the light uniformizing element for implementing uniformizing, there will still be unevenness in an image modulated by a subsequent optical engine module.

In the prior art, in order to solve the above-mentioned problem, the diffusion wheel or diffusion plate using a surface etching or coating substrate of a single diffusion angle is adopted, and considering laser light with strong energy density incident into the central region, the diffusion wheel or diffusion plate with surface etching or coating substrate of larger diffusion angle is adopted, so as to avoid the risk of surface damage to the diffusion wheel or diffusion plate due to excessive temperature in the central region. However, this will sacrifice the use of diffusion wheel or diffusion plate with smaller diffusion angles for laser light with lower energy incident to a none central region, thereby affecting the efficiency of the laser light penetrating the diffusion wheel or diffusion plate.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to an optical diffusion assembly and an optical diffusion element, which are adapted to generate different degrees of diffusion effects for incident light at different angles, and effectively reduce an overall energy loss of incident light entering the optical diffusion component or optical diffusion element.

The disclosure is directed to a projection device, which includes the aforementioned optical diffusion assembly or optical diffusion element, and is adapted to improve optical path efficiency of an optical engine module, and has better projection quality and product competitiveness.

Additional aspects and advantages of the disclosure will be set forth in the description of the techniques disclosed in the present disclosure.

In order to achieve one or a portion of or all of the objects or other objects, an embodiment of the disclosure provides an optical diffusion assembly disposed on a transmission path of a light beam. The optical diffusion assembly includes a first optical body and a second optical body. The light beam sequentially passes through the first optical body and the second optical body. The first optical body has a first surface and a second surface opposite to each other. The second optical body has a third surface and a fourth surface opposite to each other. The first surface or the third surface has a first diffusion region. The fourth surface has a second diffusion region. The first diffusion region and the second diffusion region are located on a central optical axis of the light beam. A first part of the light beam sequentially passes through the first diffusion region and the second diffusion region. A second part of the light beam passes through the first diffusion region and does not pass through the second diffusion region. An orthogonal projection of the first diffusion region on the fourth surface of the second optical body is overlapped with and greater than an orthogonal projection of the second diffusion region on the fourth surface of the second optical body.

In order to achieve one or a portion of or all of the objects or other objects, an embodiment of the disclosure provides an optical diffusion element arranged on a transmission path of a light beam. The optical diffusion element is a plano-convex condenser lens. The plano-convex condenser lens has a first surface and a second surface opposite to each other. The first surface has a first diffusion region and the second surface has a second diffusion region. The first diffusion region and the second diffusion region are located on a central optical axis of the light beam. The first surface further has two third diffusion regions, and there is a gap between the first diffusion region and any one of the two third diffusion regions. A first part of the light beam sequentially passes through the first diffusion region and the second diffusion region. A second part of the light beam sequentially passes through the gap and the second diffusion region.

In order to achieve one or a portion of or all of the objects or other objects, an embodiment of the disclosure provides a projection device including an illumination system, an optical engine module and a lens. The illumination system is adapted to provide an illumination beam, and includes a light source, an optical diffusion assembly and a light uniformizing element. The light source is adapted to provide a light beam. The optical diffusion assembly is disposed a transmission path of the light beam, and includes a first optical body and a second optical body. The light beam sequentially passes through the first optical body and the second optical body. The first optical body has a first surface and a second surface opposite to each other. The second optical body has a third surface and a fourth surface opposite to each other. The first surface or the third surface has a first diffusion region, and the fourth surface has a second diffusion region. The first diffusion region and the second diffusion region are located on a central optical axis of the light beam. A first part of the light beam sequentially passes through the first diffusion region and the second diffusion region. A second part of the light beam passes through the first diffusion region and does not pass through the second diffusion region. An orthogonal projection of the first diffusion region on the fourth surface of the second optical body is overlapped with and greater than an orthogonal projection of the second diffusion region on the fourth surface of the second optical body. The light uniformizing element is disposed on the transmission path of the light beam transmitted by the optical diffusion assembly, and is configured to form the illumination beam. The optical engine module is disposed on a transmission path of the illumination beam. The optical engine module includes a light valve module and an optical prism. The optical prism is disposed on the transmission path of the illumination beam, and is configured to guide the illumination beam to the light valve module and guide an image beam from the light valve module. The lens is disposed on a transmission path of the image beam, and is configured to project the image beam out of the projection device.

In order to achieve one or a portion of or all of the objects or other objects, an embodiment of the disclosure provides a projection device including an illumination system, an optical engine module and a lens. The illumination system is adapted to provide an illumination beam, and includes a light source, an optical diffusion assembly and a light uniformizing element. The light source is adapted to provide a light beam. The optical diffusion assembly is disposed a transmission path of the light beam, and is a plano-convex condenser lens. The plano-convex condenser lens has a first surface and a second surface opposite to each other. The first surface has a first diffusion region and the second surface has a second diffusion region. The first diffusion region and the second diffusion region are located on a central optical axis of the light beam. The first surface further has a third diffusion region, and there is a gap between the first diffusion region and the third diffusion region. A first part of the light beam sequentially passes through the first diffusion region and the second diffusion region. A second part of the light beam sequentially passes through the gap and the second diffusion region. The light uniformizing element is disposed on the transmission path of the light beam transmitted by the optical diffusion element, and is configured to form the illumination beam. The optical engine module is disposed on a transmission path of the illumination beam. The optical engine module includes a light valve module and an optical prism. The optical prism is disposed on the transmission path of the illumination beam, and is configured to guide the illumination beam to the light valve module and guide an image beam from the light valve module. The lens is disposed on a transmission path of the image beam, and is configured to project the image beam out of the projection device.

Based on the above description, the embodiments of the disclosure have at least one of the following advantages or effects. In the design of the optical diffusion assembly of the disclosure, the first surface of the first optical body or the third surface of the second optical body has the first diffusion region, and the fourth surface of the second optical body has the second diffusion region, where the first diffusion region and the second diffusion region are located on the central optical axis of the light beam, and the orthogonal projection of the first diffusion region on the fourth surface of the second optical body is overlapped with and greater than the orthogonal projection of the second diffusion region on the fourth surface of the second optical body. The first part of the light beam sequentially passes through the first diffusion region and the second diffusion region, and the second part of the light beam passes through the first diffusion region and does not pass through the second diffusion region. By setting of the first diffusion region and the second diffusion region, the incident light beam of different angles may pass through different diffusion regions. Therefore, in addition to different parts of the light beam having different diffusion effects (for example, allowing the diffusion effects to be superimposed to generate light with different degrees of diffusion), it may also reduce the energy loss of the overall incident light beam entering the optical diffusion assembly. In addition, the projection device using the optical diffusion assembly of the disclosure may improve the optical path efficiency and reliability of the optical engine module, reduce a volume of the optical engine module, and enhance flexibility of optical path design of the optical engine module, and has better projection quality and product competitiveness.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
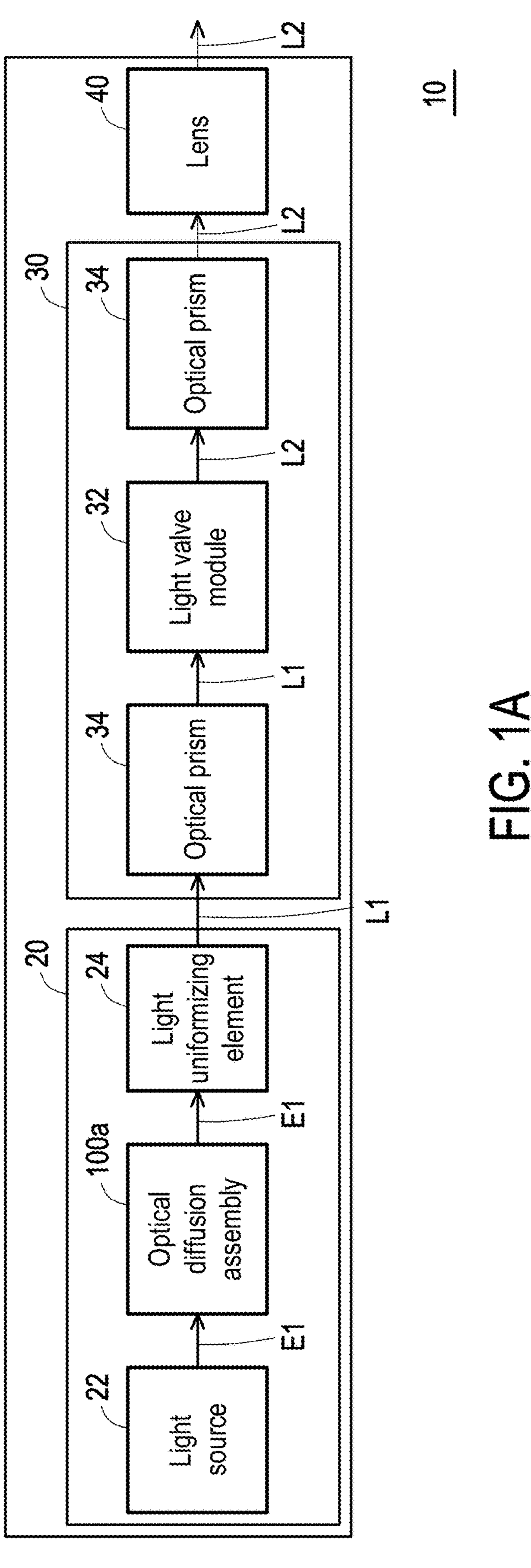
FIG. 1A is a block diagram of a projection device according to an embodiment of the disclosure.
Figure 1B:
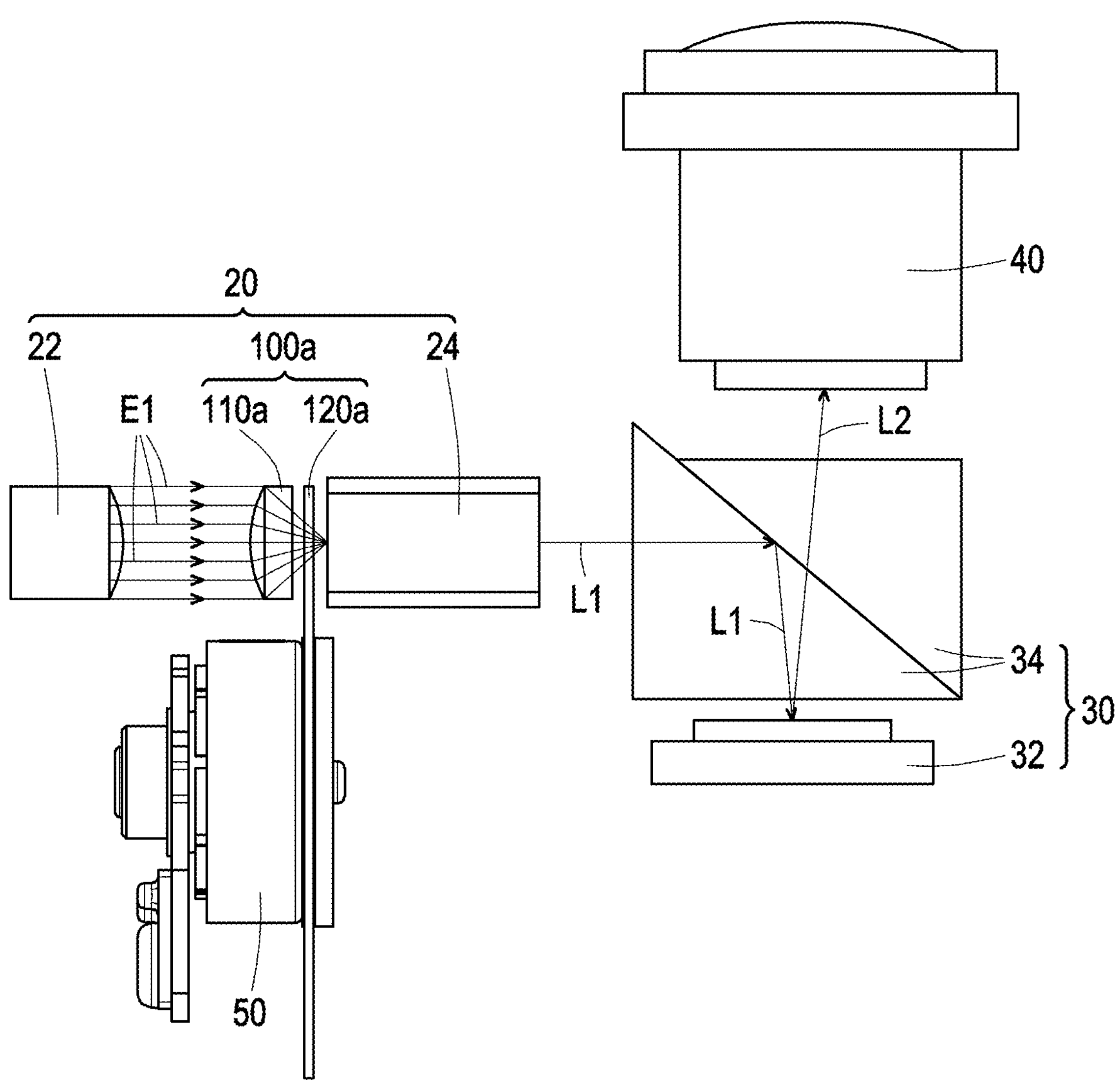
FIG. 1B is a physical schematic diagram of the projection device of FIG. 1A.
Figure 2A:
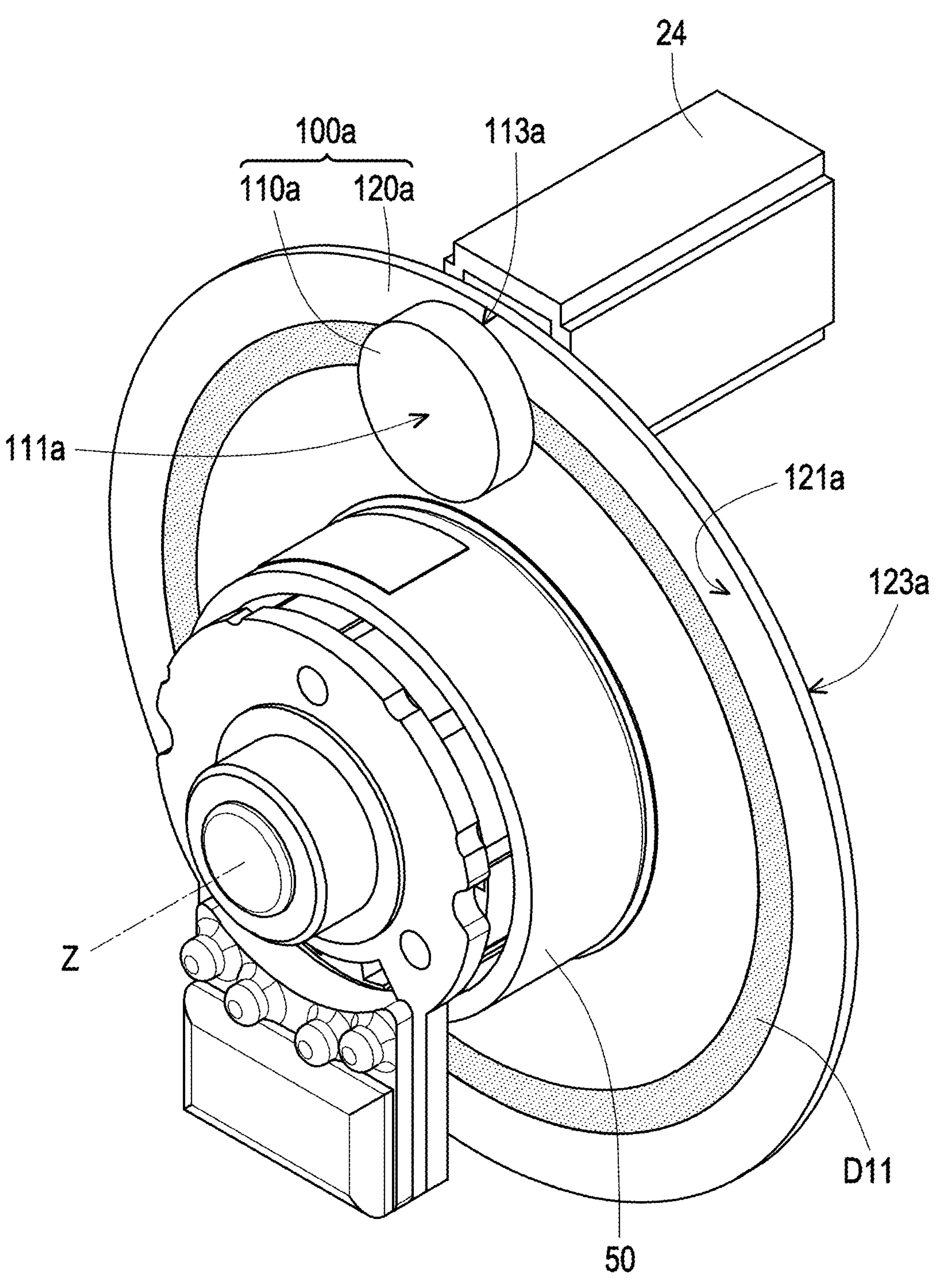
FIG. 2A is a schematic three-dimensional view of relative positions of an optical diffusion assembly and a light uniformizing element in FIG. 1A.
Figure 2B:
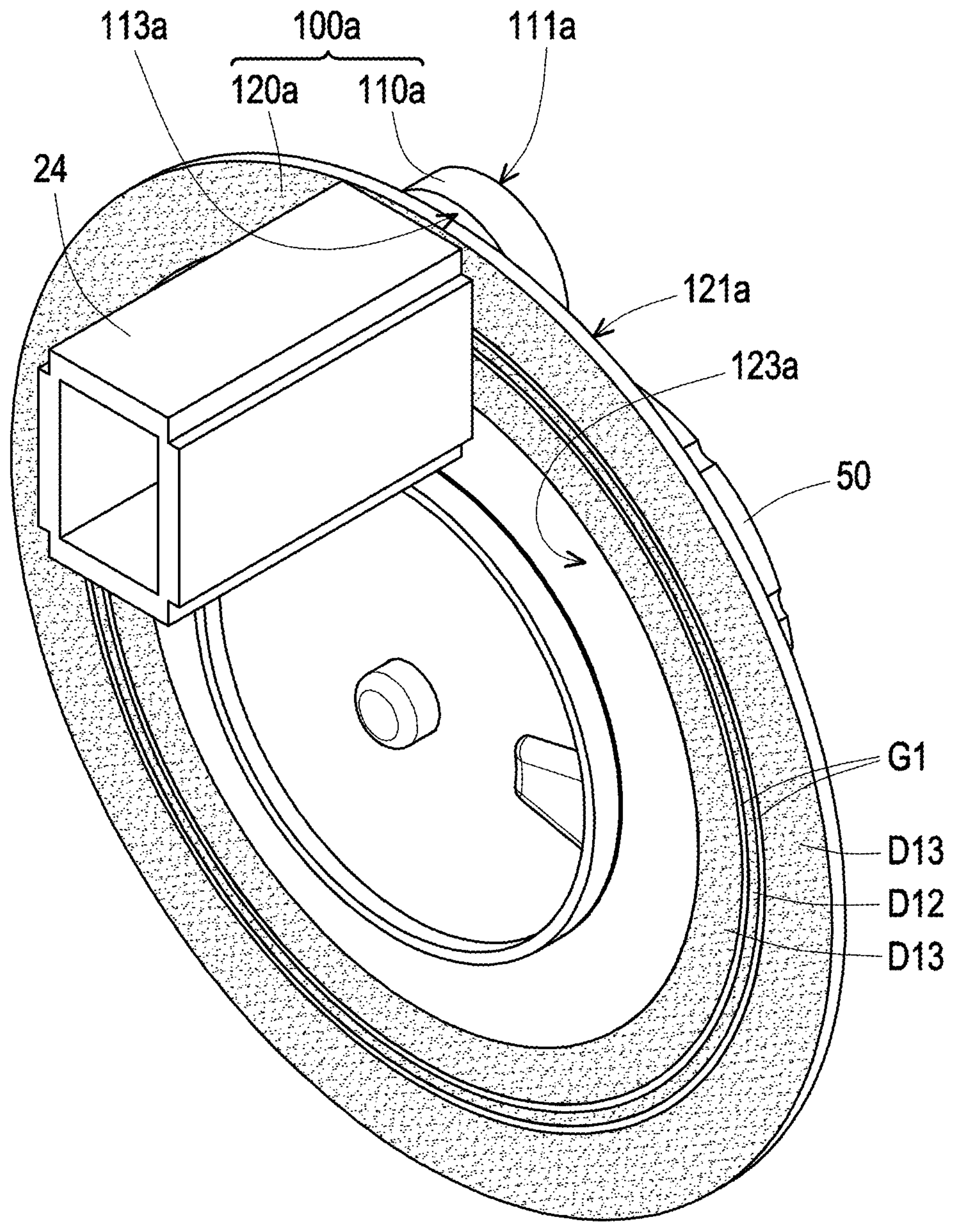
FIG. 2B is a schematic three-dimensional view of FIG. 2A from another viewing angle.
Figure 2C:
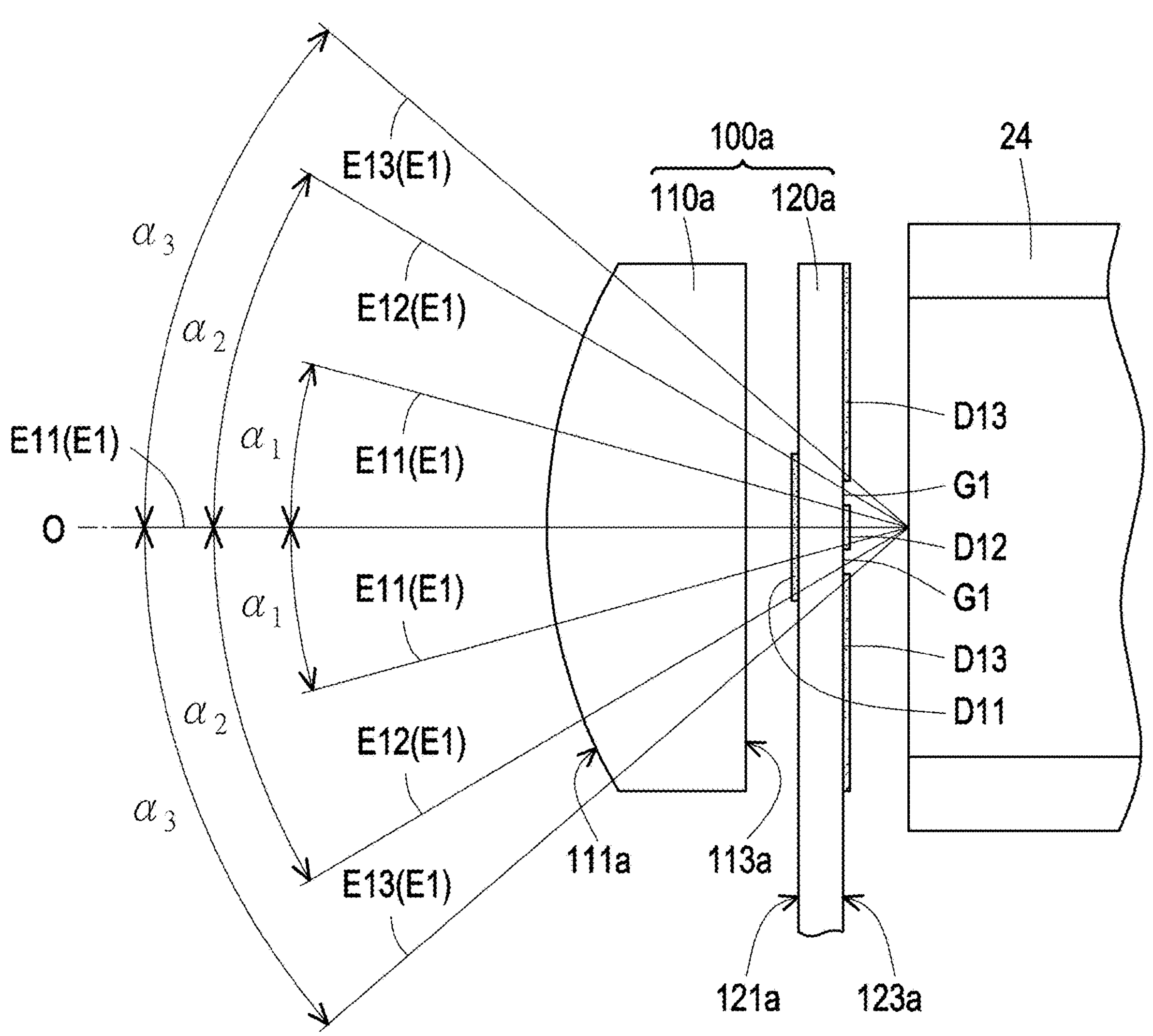
FIG. 2C is a schematic diagram of a light beam entering FIG. 2A.

FIG. 1A is a block diagram of a projection device according to an embodiment of the disclosure FIG. 1B is a physical schematic diagram of the projection device of FIG. 1A. FIG. 2A is a schematic three-dimensional view of relative positions of an optical diffusion assembly and a light uniformizing element in FIG. 1A. FIG. 2B is a schematic three-dimensional view of FIG. 2A from another viewing angle. FIG. 2C is a schematic diagram of a light beam entering FIG. 2A.

Referring to FIG. 1A and FIG. 1B at the same time, in the embodiment, a projection device 10 includes an illumination system 20, an optical engine module 30 and a lens 40. The illumination system 20 is adapted to provide an illumination beam L1 and includes a light source 22, an optical diffusion assembly 100*a* and a light uniformizing element 24. The light source 22 is adapted to provide a light beam E1. The optical diffusion assembly 100*a* is disposed on a transmission path of the light beam E1, and includes a first optical body 110*a* and a second optical body 120*a*. The light uniformizing element 24 is disposed on the transmission path of the light beam E1 transmitted from the optical diffusion assembly 100*a*, and is configured to form an illumination beam L1. The light uniformizing element 24 is, for example, an integrating rod, which may be made of reflective mirrors, and, for example, adopt multiple reflections to enhance the light uniformity. The optical engine module 30 is disposed on a transmission path of the illumination beam L1. The optical engine module 30 includes a light valve module 32 and an optical prism 34, the light valve module 32 is configured to convert the illumination beam L1 into an image beam L2. The optical prism 34 is disposed on the transmission path of the illumination beam L1 for guiding the illumination beam L1 to the light valve module 32 and guiding the image beam L2 from the light valve module 32 to the lens 40. The lens 40 is disposed on a transmission path of the image beam L2 for projecting the image beam L2 out of the projection device 10.

In an embodiment, the light source 22 may include one or a plurality of light-emitting elements, and the light-emitting elements may be, for example, one or a plurality of laser diodes (LDs), one or a plurality of light-emitting diodes (LEDs) or a combination of the above two light sources. In the embodiment, the light source 22 may further include optical elements such as a lens, a wavelength conversion element, a light splitting elements, and a reflective element to transmit lights emitted by the light-emitting elements and form a plurality of color lights, where the light beam E1 includes at least one of the color lights. In other embodiments, the plurality of light-emitting elements of the light source 22 may provide multiple color lights, and the light beam E1 includes at least one of the color lights. Specifically, any light source that meets a volume requirement may be implemented according to an actual design, which is not limited by the disclosure. The light valve module 32 of the optical engine module 30 is, for example, a reflective light modulator such as a liquid crystal on silicon panel (LCoS panel), a digital micro-mirror device (DMD), etc. In an embodiment, the light valve module 32 may be, for example, a transmissive optical modulator such as a transparent liquid crystal panel, an electro-optical modulator, a magneto-optic modulator, an acousto-optic modulator (AOM), etc., but the embodiment does not limit the form and type of the light valve module 32. Detailed steps and implementation of the method of converting the illumination beam L1 into the image beam L2 by the light valve module 32 of the optical engine module 30 may be provided with sufficient guidance, suggestions, and implementation instructions based on general knowledge in the related technical field, which will not be repeated. The optical prism 34 of the optical engine module 30 is, for example, a total internal reflection prism (TIR prism). The lens 40 includes, for example, a combination of one or more optical lenses with refractive power, for example, various combinations of non-planar lenses such as biconcave lenses, biconvex lenses, concavo-convex lenses, convexo-concave lenses, plano-convex lenses, plano-concave lenses, etc. In an embodiment, the lens 40 may also include a planar optical lens, which converts the image beam L2 from the light valve module 32 into a projection beam and projects the same out of the projection device 10 in a reflective or transmissive manner. The form and type of the lens 40 are not limited in the embodiment.

Referring to FIG. 1B again, the projection device 10 of the embodiment may also include a driving assembly 50, where the second optical body 120*a* of the optical diffusion assembly 100*a* is connected to a rotating axis Z of the driving assembly 50 (such as FIG. 2A). The first optical body 110*a* is located on a side of a third surface 121*a* of the second optical body 120*a* and is close to the light source 22. The driving assembly 50 drives the second optical body 120*a* to rotate around the rotating axis Z of the driving assembly 50. In other words, the optical diffusion assembly 100*a* of the embodiment is embodied as a moving part, but the disclosure is not limited thereto.

Then, referring to FIG. 2A, FIG. 2B and FIG. 2C at the same time, in the embodiment, the optical diffusion assembly 100*a* is disposed on the transmission path of the light beam E1, and the light beam E1 sequentially passes through the first optical body 110*a* and the second optical body 120*a*. The first optical body 110*a* has a first surface 111*a* and a second surface 113*a* opposite to each other, and the second surface 113*a* is closer to the second optical body 112*a* than the first surface 111*a*. The second optical body 120*a* has a third surface 121*a* and a fourth surface 123*a* opposite to each other, and the third surface 121*a* is closer to the first optical body 110*a* than the fourth surface 123*a*. The first surface 111*a* or the third surface 121*a* has a first diffusion region D11, and the fourth surface 123*a* has a second diffusion region D12. The first diffusion region D11 and the second diffusion region D12 are located on a central optical axis O of the light beam E1. A first part E11 of the light beam E1 sequentially passes through the first diffusion region D11 and the second diffusion region D12. A second part E12 of the light beam E1 passes through the first diffusion region D11 and does not pass through the second diffusion region D12. An orthogonal projection of the first diffusion region D11 on the fourth surface 123*a* of the second optical body 120*a* is overlapped with and larger than an orthogonal projection of the second diffusion region D12 on the fourth surface 123*a* of the second optical body 120*a*.

Further, in the embodiment, the first optical body 110*a* is embodied as a plano-convex condenser lens, and the second optical body 120*a* is embodied as a disc-shaped diffusion element. Here, the third surface 121*a* (i.e., a light incident surface) of the second optical body 120*a* has the first diffusion region D11, and the fourth surface 123*a* (i.e., a light output surface) of the second optical body 120*a* has the second diffusion region D12 and two third diffusion regions D13. The third surface 121*a* of the second optical body 120*a* is parallel to the fourth surface 123*a*. The second diffusion region D12 is located between the two third diffusion regions D13, and there is a gap G1 between any one of the two third diffusion regions D13 and the second diffusion region D12. The formation of the first diffusion region D11, the second diffusion region D12 and the two third diffusion region D13 is, for example, to etch or coat annular regions with different hazes (used to form light with different diffusion angles) on the third surface 121*a* and the fourth surface 123*a* of the second optical body 120*a*. Preferably, an area of the first diffusion region D11 is smaller than a sum of areas of the second diffusion region D12 and the two third diffusion regions D13. A haze of the first diffusion region D11 is greater than a haze of the second diffusion region D12 and a haze of the two third diffusion regions D13, where the haze of the second diffusion region D12 is, for example, the same as the haze of the two third diffusion regions D13.

The first part E11, second part E12, and third part E13 of the light beam E1 refer to different parts of the incident light beam distributed outward from the central optical axis O at the same time point. Generally, the closer to the central optical axis O of the light beam E1, i.e., the first part E11 of the beam E1, the incident angle is smaller and the light energy is greater, and it is necessary to use a diffuser with a larger haze, in the case of the third part E13 of the light beam E1, the incident angle is large and the light energy is small, and it is necessary to use a diffuser with a smaller haze. Namely, the light energy distributions of the first part E11, the second part E12 and the third part E13 of the light beam E1 are from large to small.

As shown in FIG. 2A and FIG. 2C, when the second optical body 120*a* is driven by the driving assembly 50, the incident light is incident to the second optical body 120*a* through the first optical body 110*a* at different incident angles α1, α2, and α3. The incident light will be incident on different regions according to the incident angles α1, α2, α3 to generate output light with different diffusion angles. In detail, the first part E11 of the light beam E1 has the incident angle α1, for example, 0° to 15°, and may sequentially pass through the first diffusion region D11 and the second diffusion region D12, i.e., pass through two different hazes. For example, a diffusion angle of the first part E11 of the light beam E1 passing through the first diffusion region D11 is, for example, 2.5 degrees, a diffusion angle of the first part E11 of the light beam E1 passing through the second diffusion region D12 is, for example, 1.5 degrees, which may generate the output light with a diffusion angle of 4.0 degrees. The second part E12 of the light beam E1 has the incident angle α2, for example, 30°, which sequentially passes through the first diffusion region D11 and the gap G1, i.e., only passes through one haze, and generates the output light with a diffusion angle of 2.5°. The third part E13 of the light beam E1 has the incident angle α3, for example, 40°, which passes through at least one of the two third diffusion regions D13 and does not pass through the first diffusion region D11, i.e., only passes through one haze. That is, the third part E13 of the light beam E1 passes through at least one of the two third diffusion region D13 to generate the output light with a diffusion angle of 1.5 degrees.

In brief, by configuring the first diffusion region D11, the second diffusion region D12 and the two third diffusion regions D13, the incident light beam of different angles may pass through different diffusion regions. Therefore, in addition to different parts of the light beam E1 having different diffusion effects, such as allowing the diffusion effects may be superimposed to generate light with different diffusion degrees, the light energy loss of the overall incident light beam entering the optical diffusion assembly 100*a* may also be reduced. In addition, the projection device 10 using the optical diffusion assembly 100*a* of the embodiment may improve the optical path efficiency and reliability of the optical engine module 30, reduce a volume of the optical engine module 30 and enhance flexibility of optical path design of the optical engine module 30, and have better projection quality and product competitiveness.

Other embodiments will be provided below for further explanations. It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 3A:
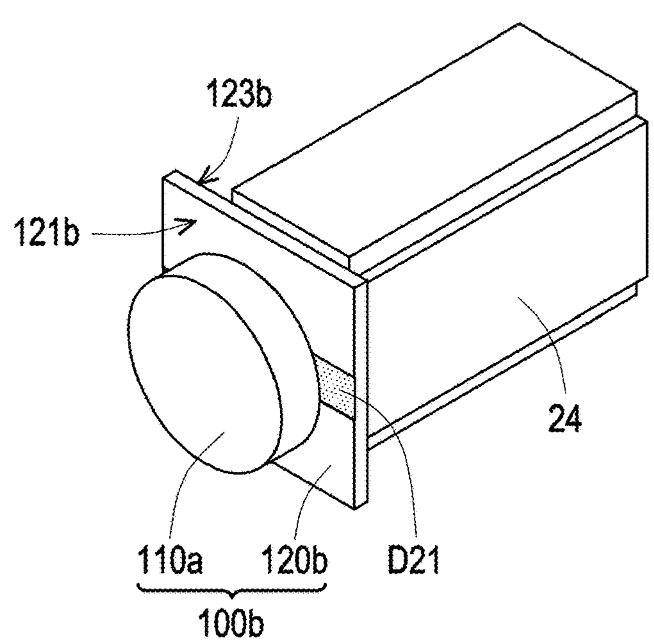
FIG. 3A is a schematic three-dimensional view of relative positions of an optical diffusion assembly and a light uniformizing element according to an embodiment of the disclosure.
Figure 3B:
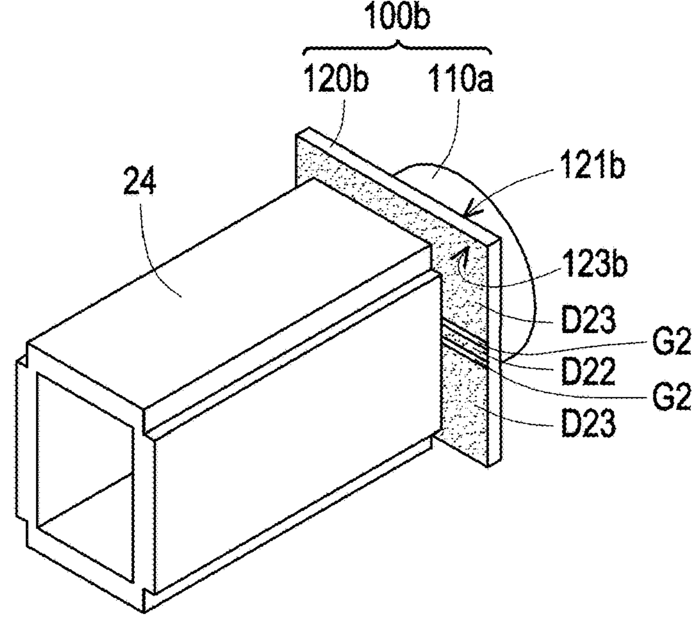
FIG. 3B is a schematic three-dimensional view of FIG. 3A from another viewing angle.
Figure 3C:
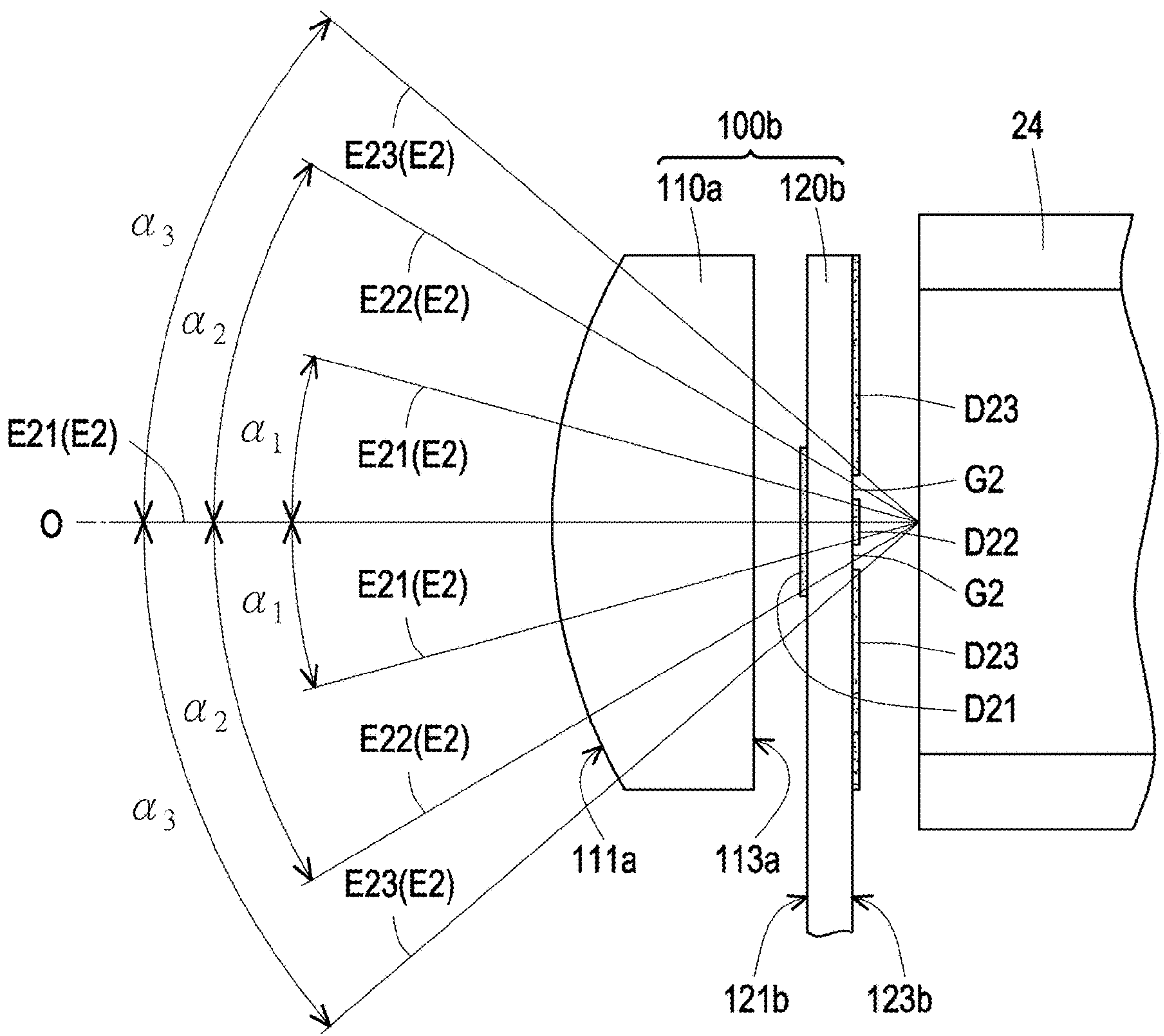
FIG. 3C is a schematic diagram of a light beam entering FIG. 3A.

FIG. 3A is a schematic three-dimensional view of relative positions of an optical diffusion assembly and a light uniformizing element according to an embodiment of the disclosure. FIG. 3B is a schematic three-dimensional view of FIG. 3A from another viewing angle. FIG. 3C is a schematic diagram of a light beam entering FIG. 3A. Referring to FIG. 2A, FIG. 2B, FIG. 3A and FIG. 3B at the same time, an optical diffusion assembly 100*b* of the embodiment is similar to the optical diffusion assembly 100*a* in FIG. 2A, and main difference there between is that in this embodiment, the optical diffusion assembly 100*b* is embodied as a fixed part, i.e., it will not be rotated, and a second optical body 120*b* is embodied as a plate-shaped diffusion element, and formation of a first diffusion region D21, a second diffusion region D22 and two third diffusion regions D23 is to, for example, etch or coat strip-shaped regions with different hazes on a third surface 121*b* and a fourth surface 123*b* of the second optical body 120*b*. In detail, the third surface 121*b* of the second optical body 120*b* has the first diffusion region D21, and the fourth surface 123*b* of the second optical body 120*b* has the second diffusion region D22 and two third diffusion regions D23. The second diffusion region D22 is located between the two third diffusion regions D23, and there is a gap G2 between any one of the two third diffusion regions D23 and the second diffusion region D22.

Referring to FIG. 3C, in the embodiment, a first part E21 of a light beam E2 has the incident angle α1, for example, 0 to 15 degrees, which may sequentially pass through the first diffusion region D21 and the second diffusion region D22, i.e. pass through two different hazes. For example, a diffusion angle of the first part E21 of the light beam E2 passing through the first diffusion region D21 is, for example, 2.5 degrees, a diffusion angle of the first part E21 of the light beam E2 passing through the second diffusion region D22 is, for example, 1.5 degrees, which may generate the output light with a diffusion angle of 4.0 degrees. The second part E22 of the light beam E2 has the incident angle α2, for example, 30°, which sequentially passes through the first diffusion region D21 and the gap G2, i.e., only passes through one haze, and generates the output light with a diffusion angle of 2.5°. The third part E23 of the light beam E2 has the incident angle α3, for example, 40°, which passes through at least one of the two third diffusion regions D23 and does not pass through the first diffusion region D21, i.e., only passes through one haze. That is, the third part E23 of the light beam E2 passes through at least one of the two third diffusion region D23 to generate the output light with a diffusion angle of 1.5 degrees.

Figure 4A:
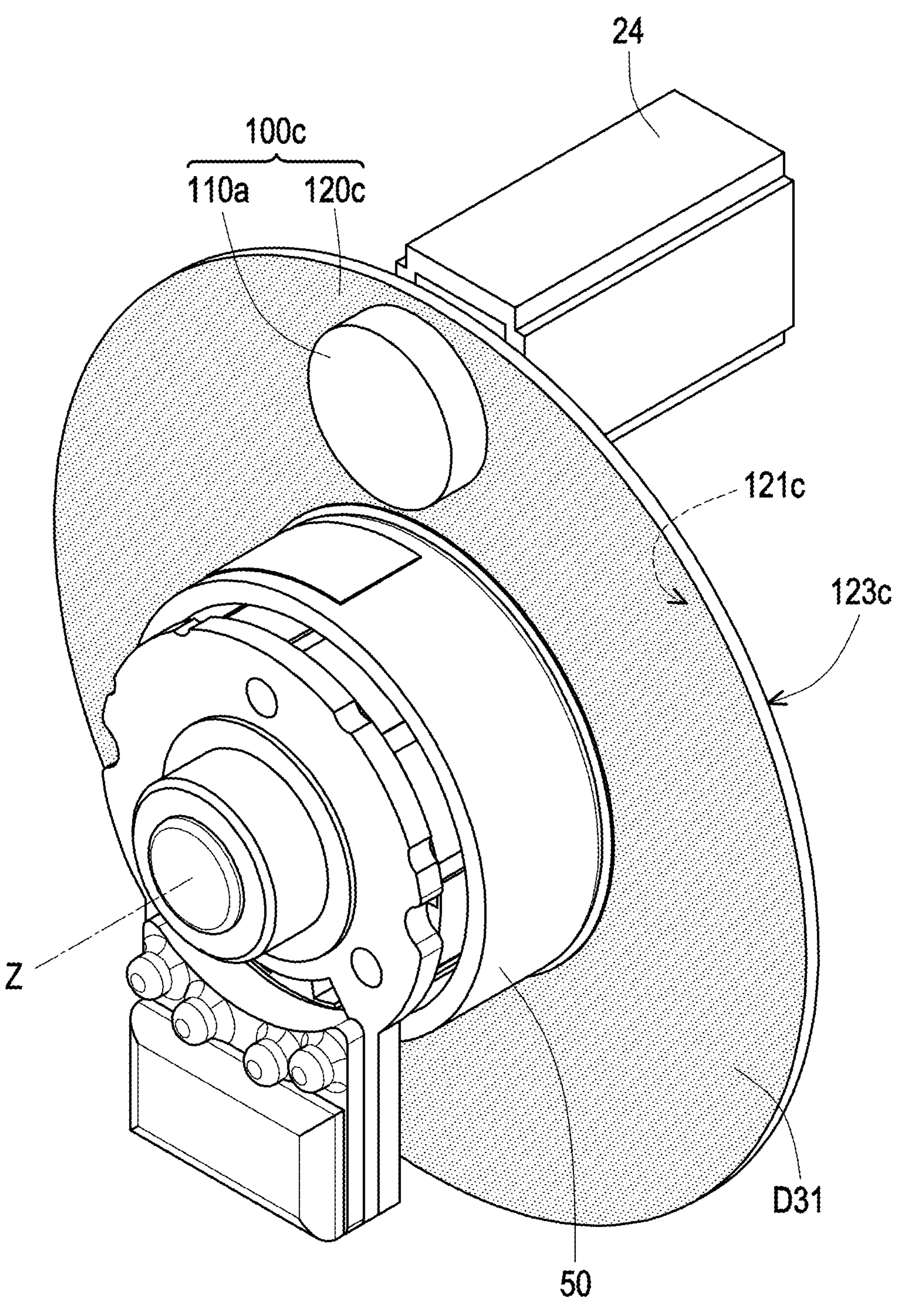
FIG. 4A is a schematic three-dimensional view of relative positions of an optical diffusion assembly and a light uniformizing element according to another embodiment of the disclosure.
Figure 4B:
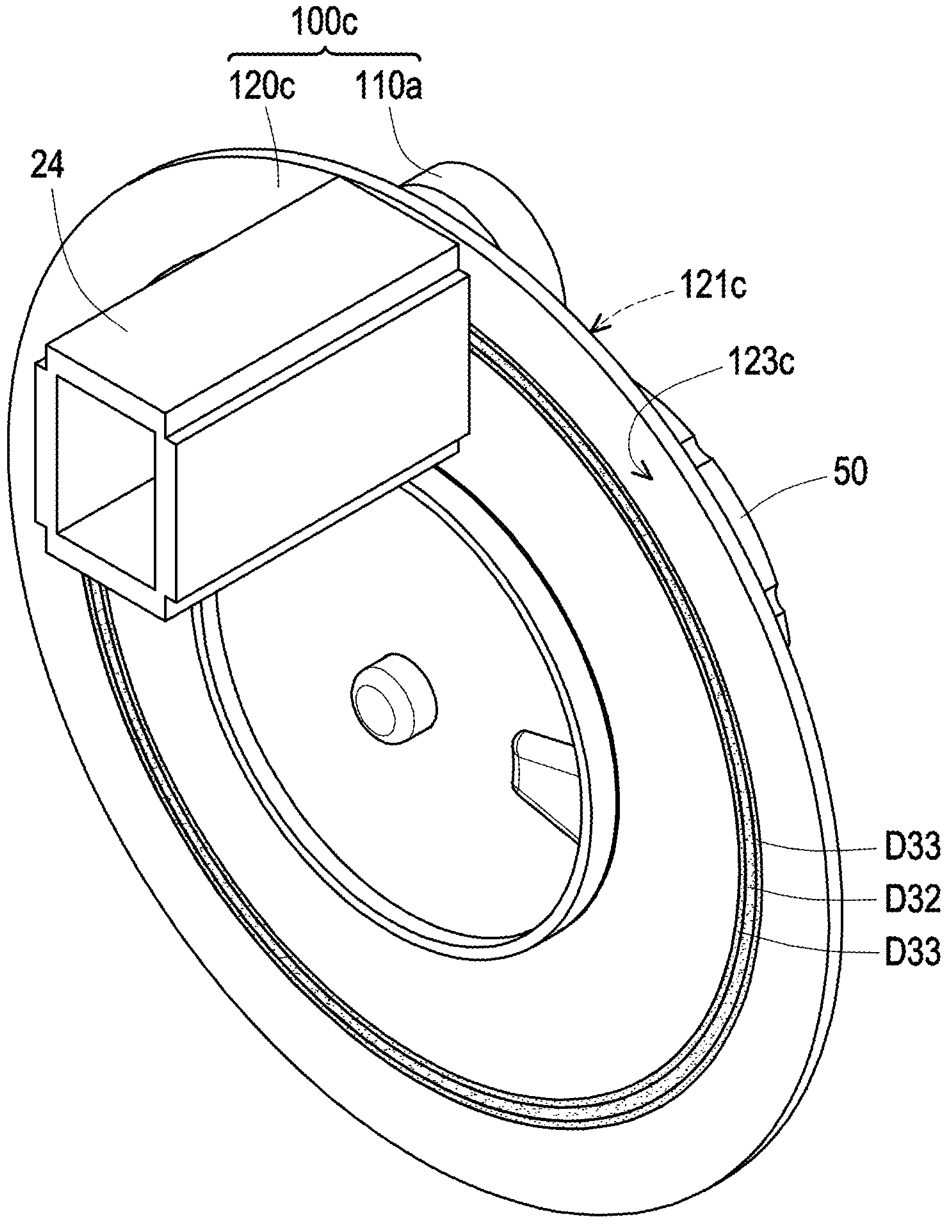
FIG. 4B is a schematic three-dimensional view of FIG. 4A from another viewing angle.
Figure 4C:
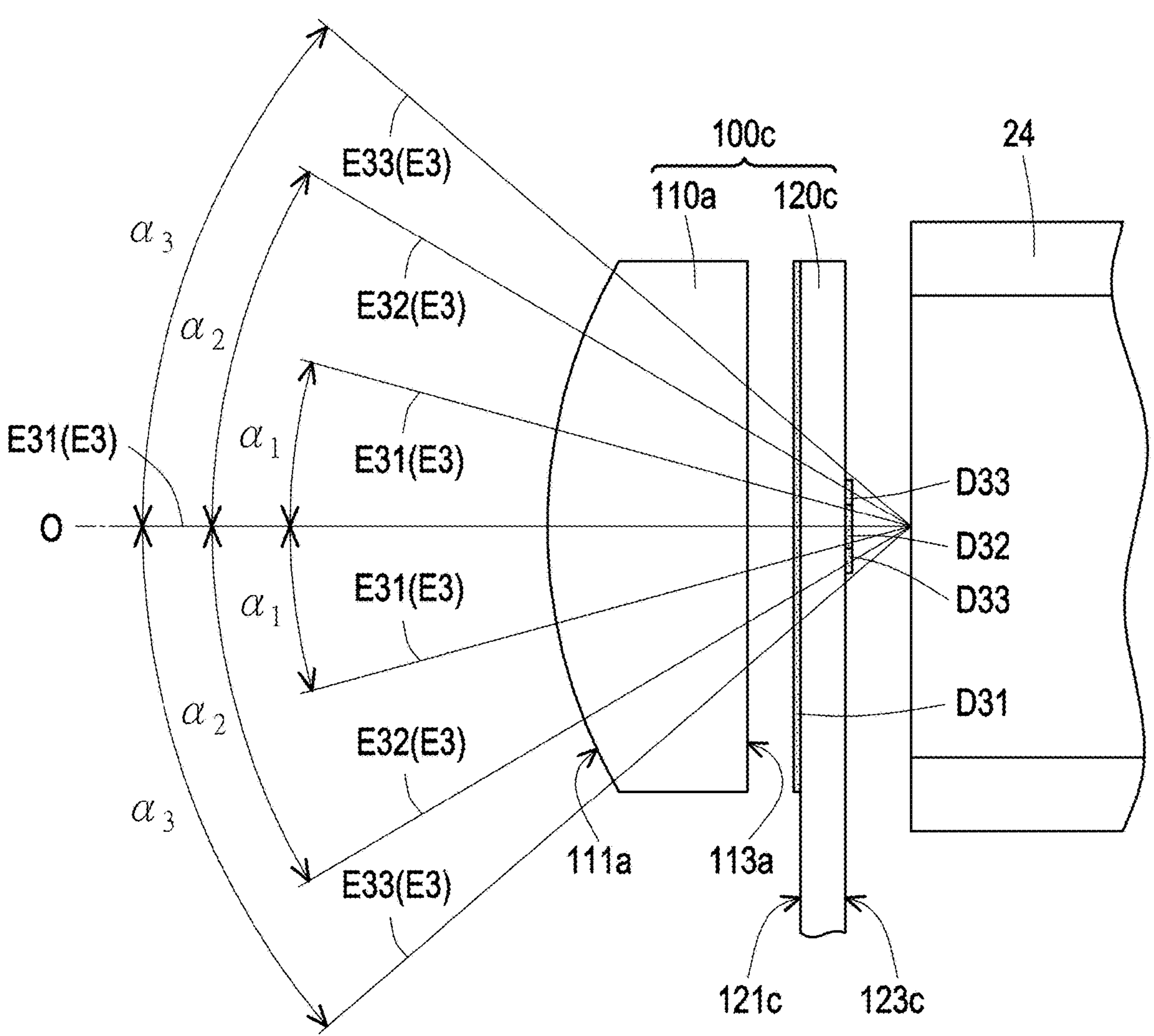
FIG. 4C is a schematic diagram of a light beam entering FIG. 4A.

FIG. 4A is a schematic three-dimensional view of relative positions of an optical diffusion assembly and a light uniformizing element according to another embodiment of the disclosure. FIG. 4B is a schematic three-dimensional view of FIG. 4A from another viewing angle. FIG. 4C is a schematic diagram of a light beam entering FIG. 4A. Referring to FIG. 2A, FIG. 2B, FIG. 4A and FIG. 4B at the same time, an optical diffusion assembly 100*c* of the embodiment is similar to the optical diffusion assembly 100*a* in FIG. 2A, and main difference there between is that in this embodiment, a second optical body 120*c* is a disc-shaped diffusion element. A third surface 121*c* of the second optical body 120*c* has a first diffusion region D31, and a fourth surface 123*c* of the second optical body 120*c* has a second diffusion region D32 and two third diffusion regions D33. The second diffusion region D32 is located between the two third diffusion regions D33, and the second diffusion region D32 and the two third diffusion regions D33 are arranged adjacent to each other without gaps, i.e., the second diffusion region D32 is continuously connected to any one of the two third diffusion regions D33 without a gap there between. In this way, an area of the first diffusion region D31 is greater than a sum of areas of the second diffusion region D32 and the two third diffusion regions D33. A haze of the second diffusion region D32 is greater than a haze of the first diffusion region D31 and a haze of the two third diffusion regions D33, where the haze of the first diffusion region D31 and the haze of the two third diffusion region D33 are the same.

Referring to FIG. 4C, in the embodiment, a first part E31 of a light beam E3 has the incident angle α1, for example, 0 to 15 degrees, which may sequentially pass through the first diffusion region D31 and the second diffusion region D32, i.e. pass through two different hazes. For example, a diffusion angle of the first part E31 of the light beam E3 passing through the first diffusion region D31 is, for example, 1.5 degrees, a diffusion angle of the first part E31 of the light beam E3 passing through the second diffusion region D32 is, for example, 2.5 degrees, which may generate the output light with a diffusion angle of 4.0 degrees. The second part E32 of the light beam E3 has the incident angle α2, for example, 30°, which sequentially passes through the first diffusion region D31 and at least one of the two third diffusion regions D33, i.e. passes through two different hazes, where a diffusion angle of the second part E32 of the light beam E3 passing through at least one of the two third diffusion region D33 is, for example, 1.5 degrees, which may generate the output light with a diffusion angle of 3.0 degrees. The third part E33 of the light beam E3 has the incident angle α3 of, for example, 40°, which passes through the first diffusion region D31 and does not pass through the second diffusion region D32 and the two third diffusion regions D33, i.e., only passes through one haze to generate the output light with a diffusion angle of 1.5 degrees.

Figure 5A:
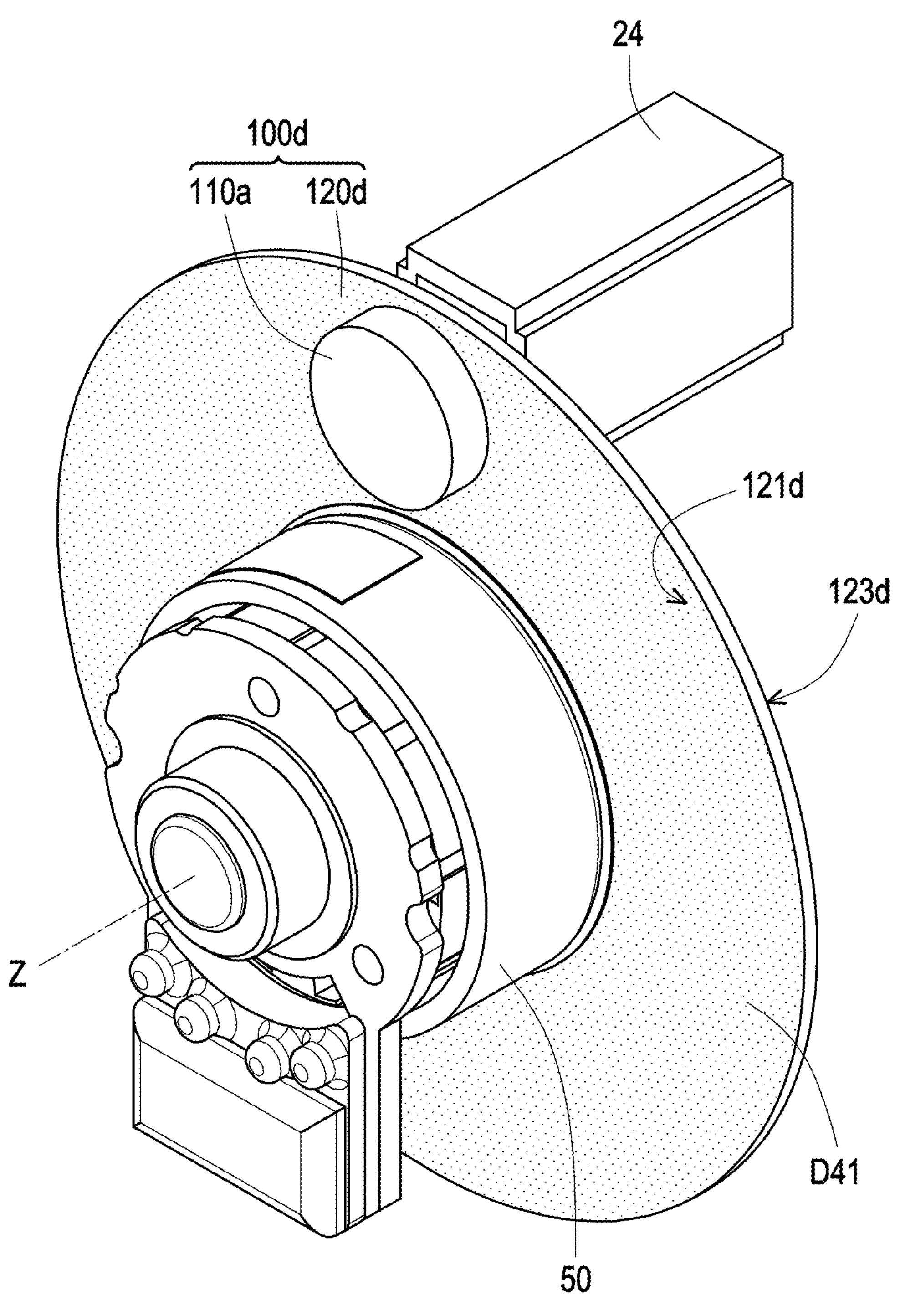
FIG. 5A is a schematic three-dimensional view of relative positions of an optical diffusion assembly and a light uniformizing element according to another embodiment of the disclosure.
Figure 5B:
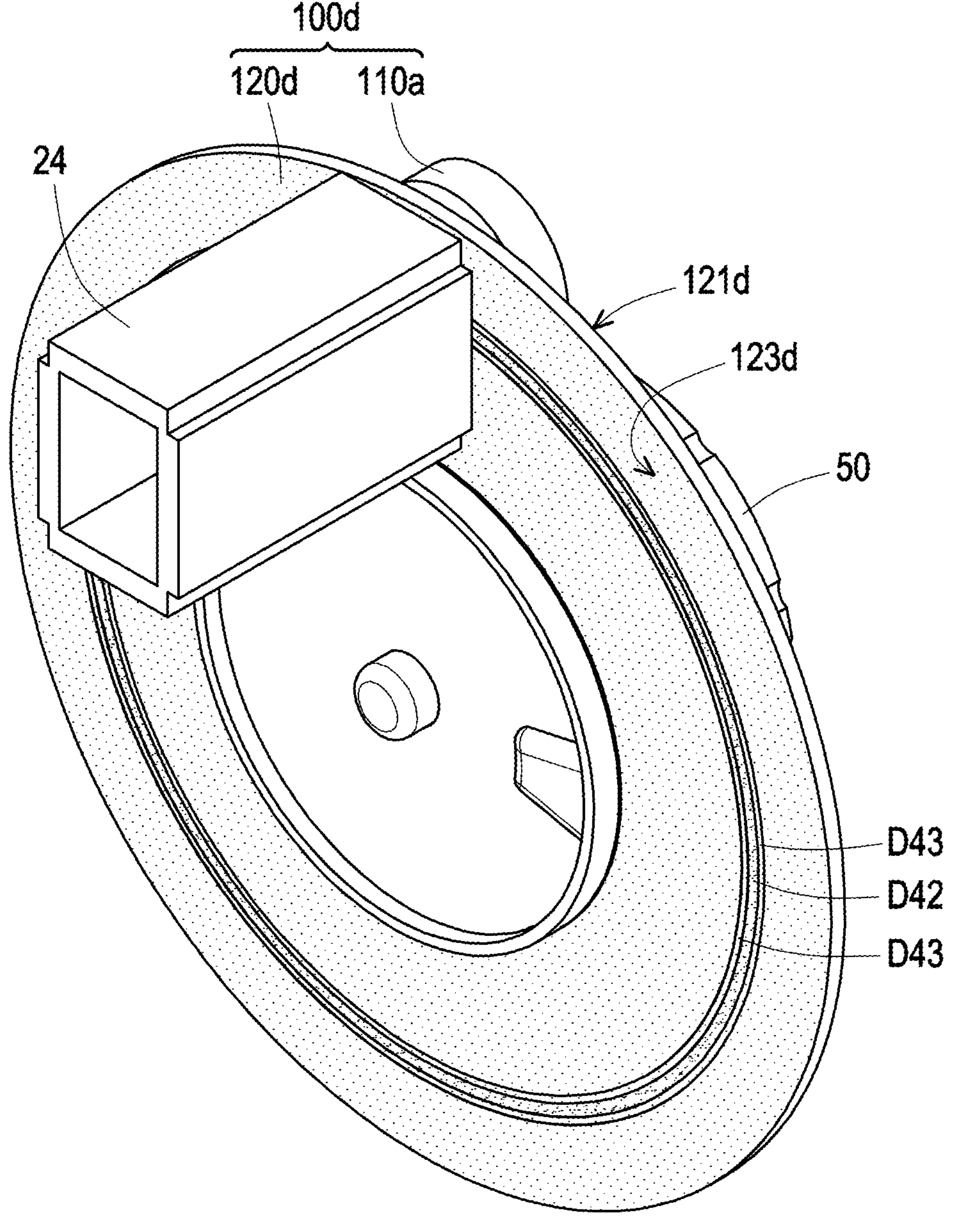
FIG. 5B is a schematic three-dimensional view of FIG. 5A from another viewing angle.
Figure 5C:
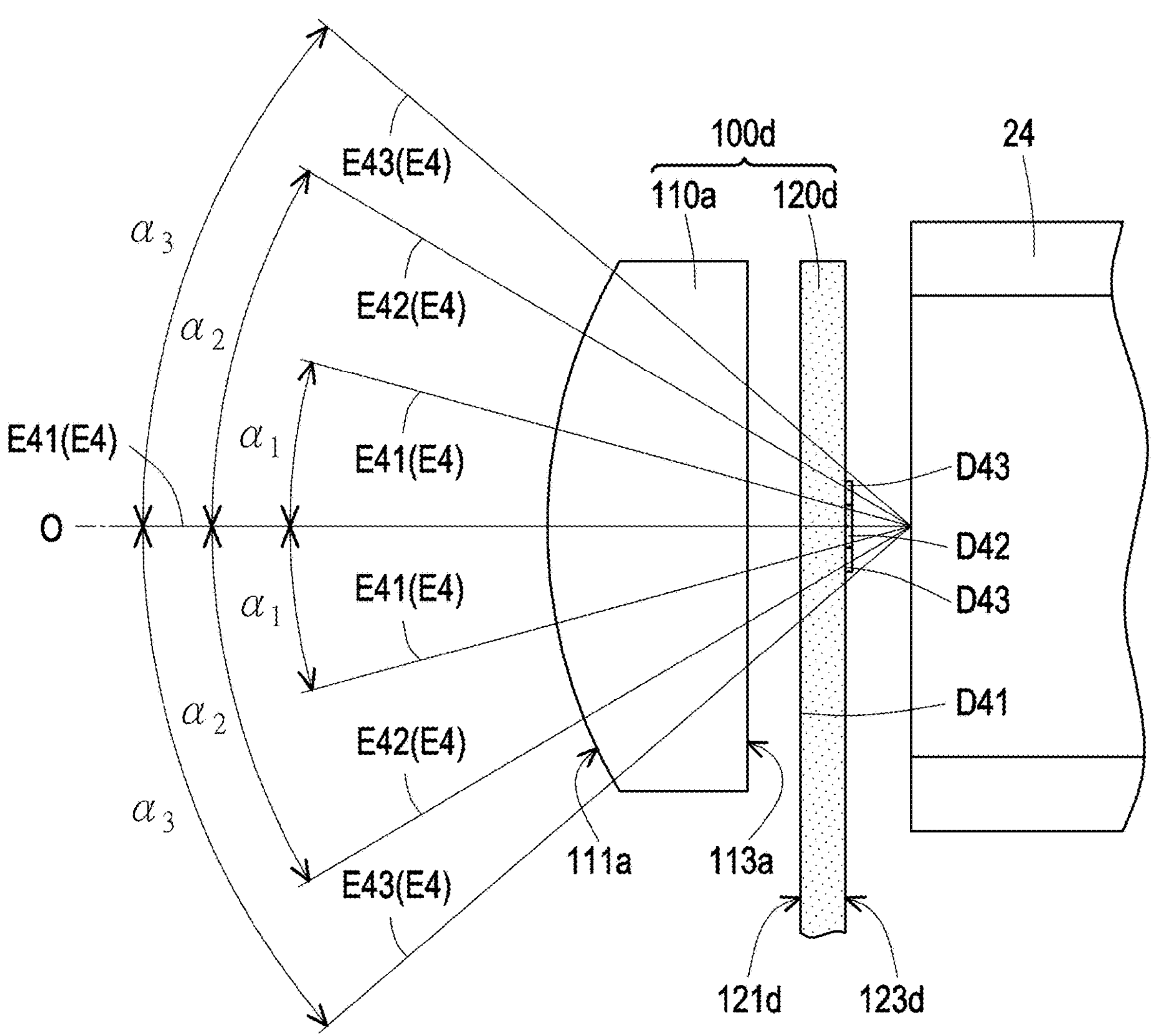
FIG. 5C is a schematic diagram of a light beam entering FIG. 5A.

FIG. 5A is a schematic three-dimensional view of relative positions of an optical diffusion assembly and a light uniformizing element according to another embodiment of the disclosure. FIG. 5B is a schematic three-dimensional view of FIG. 5A from another viewing angle. FIG. 5C is a schematic diagram of a light beam entering FIG. 5A. Referring to FIG. 2A, FIG. 2B, FIG. 5A and FIG. 5B at the same time, an optical diffusion assembly 100*d* of the embodiment is similar to the optical diffusion assembly 100*a* in FIG. 2A, and main difference there between is that in this embodiment, a second optical body 120*d* is a disc-shaped diffusion element with diffusion particles. A third surface 121*d* of the second optical body 120*d* has a part of a first diffusion region D41, and a fourth surface 123*d* of the second optical body 120*d* has a second diffusion region D42 and two third diffusion regions D43. The second diffusion region D42 is located between the two third diffusion regions D43, and any one of the two third diffusion regions D43 and the second diffusion region D42 are connected in a continuous configuration without a gap there between. A haze of the second diffusion region D42 is different from a haze of the two third diffusion regions D43 and a haze of the first diffusion region D41.

Referring to FIG. 5C, in the embodiment, a first part E41 of a light beam E4 has the incident angle α1, for example, 0 to 15 degrees, which may sequentially pass through the first diffusion region D41 and the second diffusion region D42, i.e. pass through two different hazes. For example, a diffusion angle of the first part E41 of the light beam E4 passing through the first diffusion region D41 is, for example, 1.5 degrees, a diffusion angle of the first part E41 of the light beam E4 passing through the second diffusion region D42 is, for example, 2.5 degrees, which may generate the output light with a diffusion angle of 4.0 degrees. The second part E42 of the light beam E4 has the incident angle α2, for example, 30°, which sequentially passes through the first diffusion region D41 and at least one of the two third diffusion regions D43, i.e. passes through two different hazes, where a diffusion angle of the second part E42 of the light beam E4 passing through at least one of the two third diffusion region D43 is, for example, 1.5 degrees, which may generate the output light with a diffusion angle of 3.0 degrees. The third part E43 of the light beam E4 has the incident angle α3, for example, 40°, which only passes through the first diffusion region D41, i.e., only passes through one haze to generate the output light with a diffusion angle of 1.5 degrees.

Figure 6A:
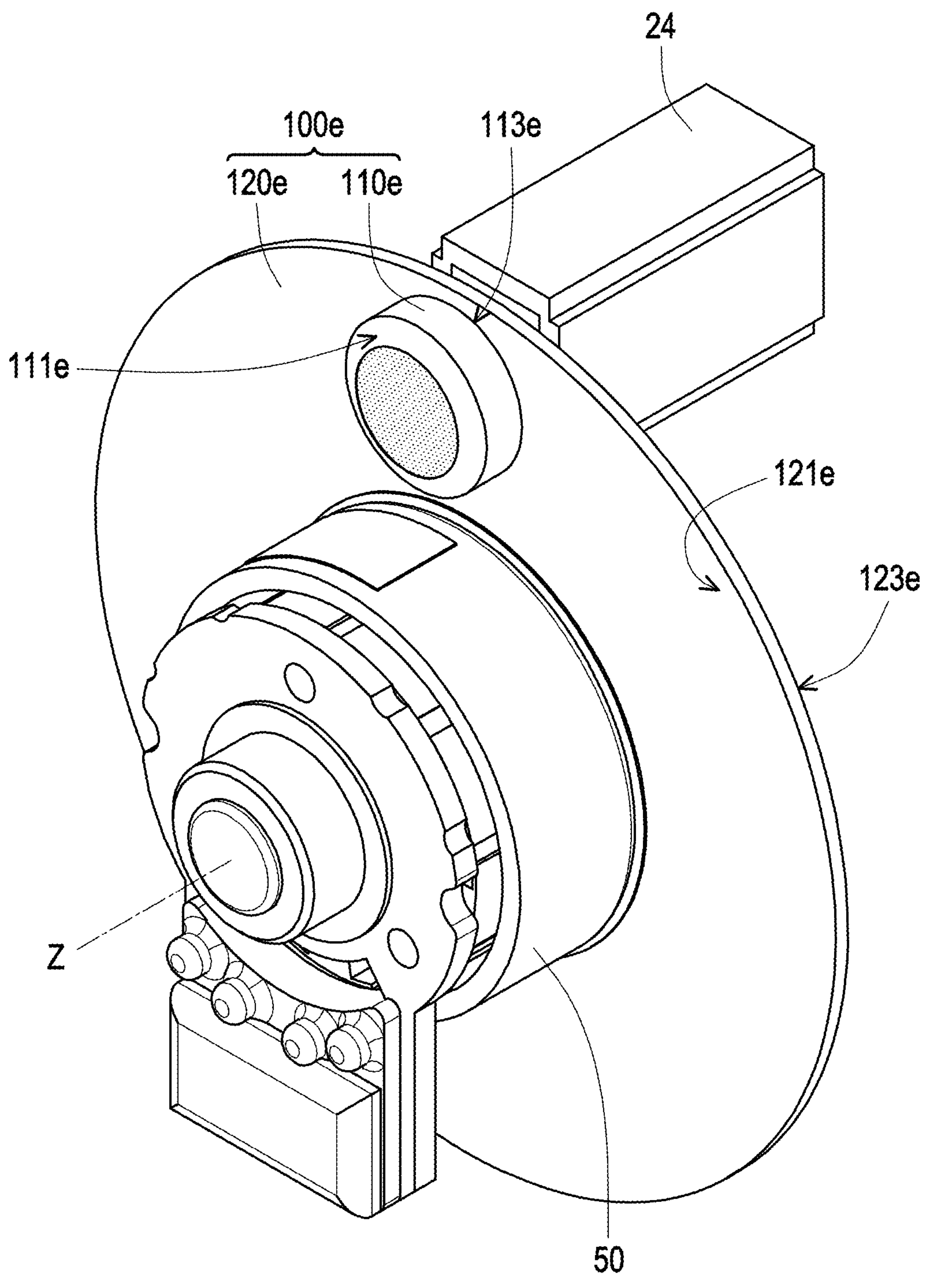
FIG. 6A is a schematic three-dimensional view of relative positions of an optical diffusion assembly and a light uniformizing element according to another embodiment of the disclosure.
Figure 6B:
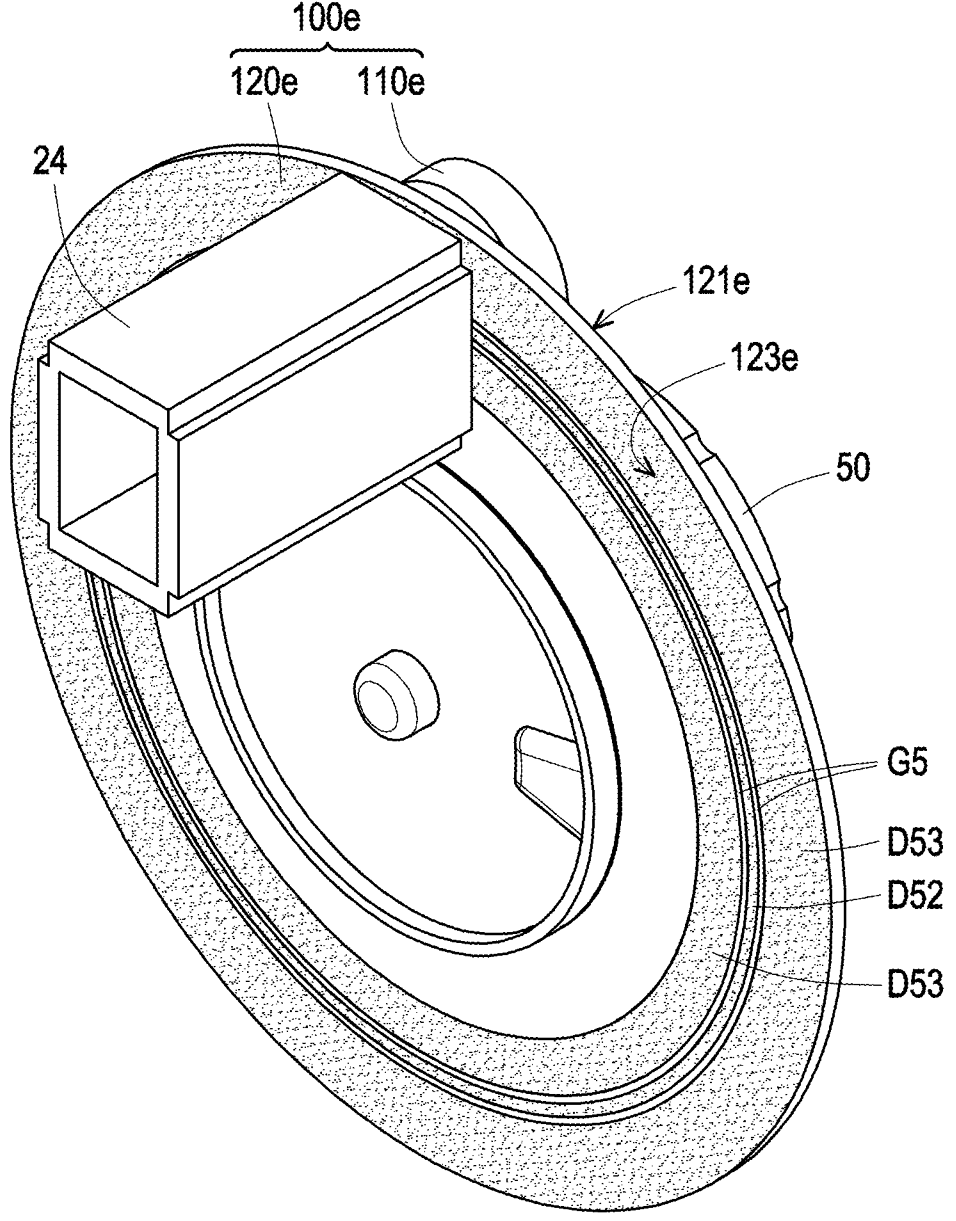
FIG. 6B is a schematic three-dimensional view of FIG. 6A from another viewing angle.
Figure 6C:
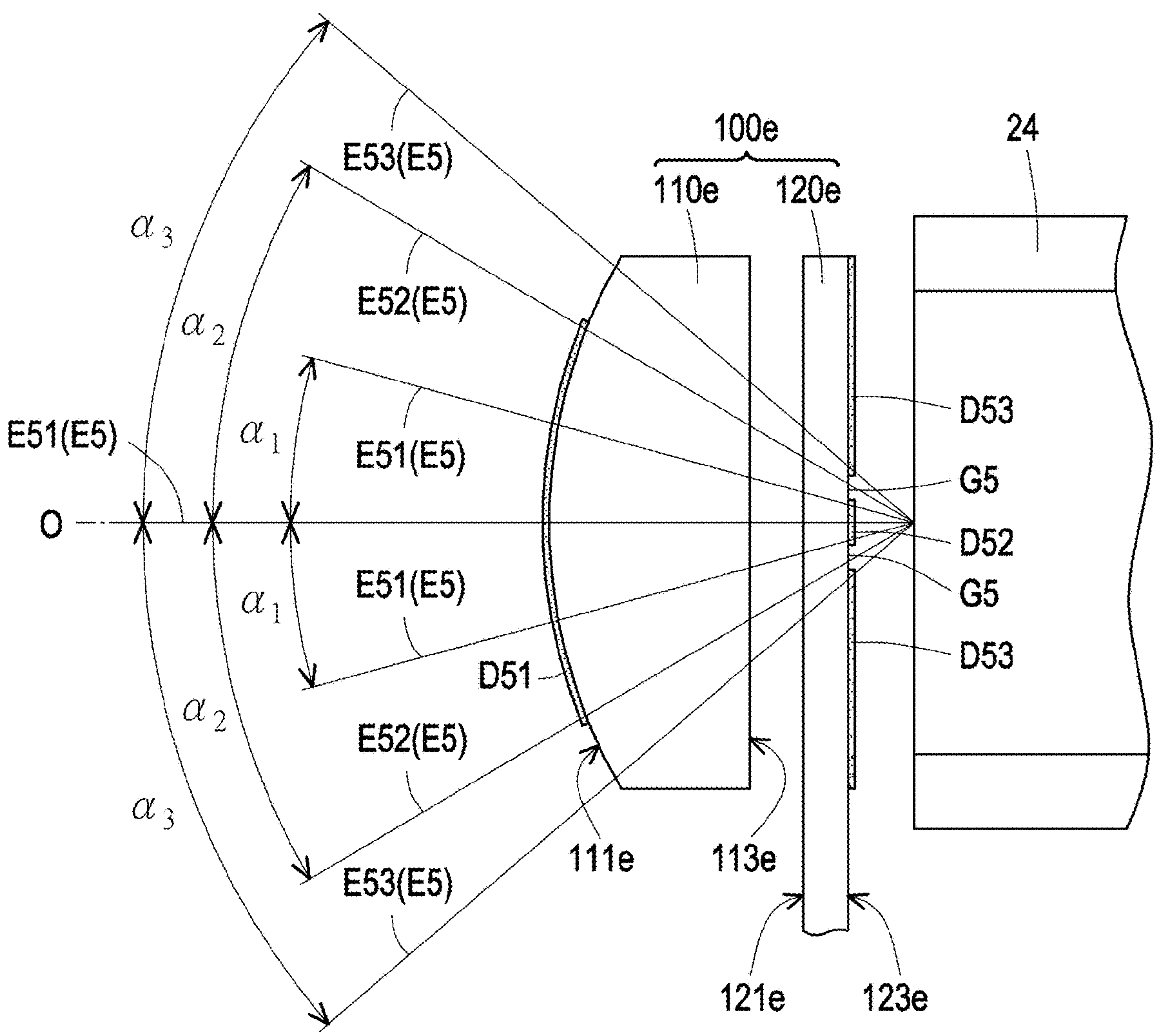
FIG. 6C is a schematic diagram of a light beam entering FIG. 6A.

FIG. 6A is a schematic three-dimensional view of relative positions of an optical diffusion assembly and a light uniformizing element according to another embodiment of the disclosure. FIG. 6B is a schematic three-dimensional view of FIG. 6A from another viewing angle. FIG. 6C is a schematic diagram of a light beam entering FIG. 6A. Referring to FIG. 2A, FIG. 2B, FIG. 6A and FIG. 6B at the same time, an optical diffusion assembly 100*e* of the embodiment is similar to the optical diffusion assembly 100*a* in FIG. 2A, and main difference there between is that in this embodiment, the first optical body 110*e* is a plano-convex condenser lens, and the second optical body 120*e* is a disc-shaped diffusion element. A first surface 111*e* of the first optical body 110*e* has a first diffusion region D51, and a second surface 113*e* of the first optical body 110*e* faces a third surface 121*e* of the second optical body 120*e*. Here, the first surface 111*e* is embodied as a convex surface of the plano-convex condenser lens. A fourth surface 123*e* of the second optical body 120*e* has a second diffusion region D52 and two third diffusion regions D53. The second diffusion region D52 is located between the two third diffusion regions D53, and there is a gap G5 between any one of the two third diffusion regions D53 and the second diffusion region D52. Preferably, an area of the first diffusion region D51 is smaller than a sum of areas of the second diffusion region D52 and the two third diffusion regions D53. A haze of the first diffusion region D51 is greater than a haze of the second diffusion region D52 and a haze of the two third diffusion regions D53. Here, the haze of the second diffusion region D52 and the haze of the two third diffusion regions D53 are the same.

Referring to FIG. 6C, in the embodiment, a first part E51 of a light beam E5 has the incident angle α1, for example, 0 to 15 degrees, which may sequentially pass through the first diffusion region D51 and the second diffusion region D52, i.e. pass through two different hazes. For example, a diffusion angle of the first part E51 of the light beam E5 passing through the first diffusion region D51 is, for example, 2.5 degrees, a diffusion angle of the first part E51 of the light beam E5 passing through the second diffusion region D52 is, for example, 1.5 degrees, which may generate the output light with a diffusion angle of 4.0 degrees. The second part E52 of the light beam E5 has the incident angle α2 of, for example, 30°, which sequentially passes through the first diffusion region D51 and the gap G5, i.e. only passes through one haze to generate the output light with a diffusion angle of 2.5 degrees. The third part E53 of the light beam E5 has the incident angle α3 of, for example 40 degrees, which passes through at least one of the two third diffusion regions D53 and does not pass through the first diffusion region D51, i.e., only passes through one haze, wherein the third part E53 of the light beam E5 passes through at least one of the two third diffusion region D53 to generate the output light with a diffusion angle of 1.5 degrees.

In the embodiment, since only the first surface 111*e* of the first optical body 110*e* has the first diffusion region D51, only the fourth surface 123*e* of the second optical body 120*e* has the second diffusion region D52 and the two third diffusion regions D53, which means by etching or coating a single region of the optical body with one diffusion angle, manufacturing complexity of the optical diffusion assembly 100*f* is reduced and manufacturing quality is improved.

Figure 7A:
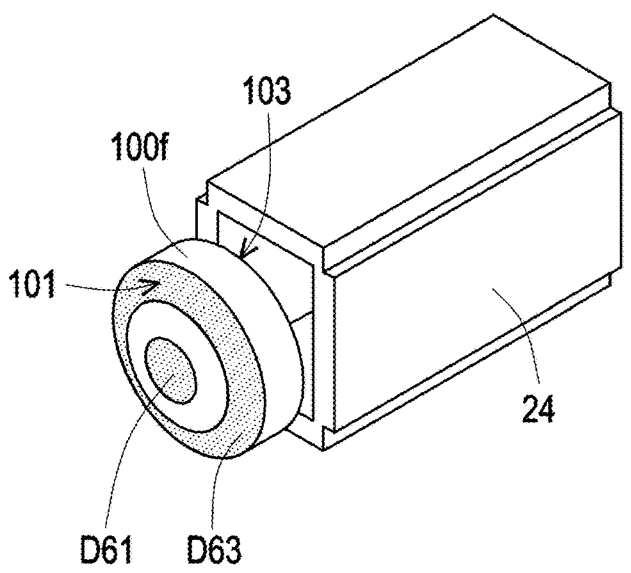
FIG. 7A is a schematic three-dimensional view of relative positions of an optical diffusion assembly and a light uniformizing element according to another embodiment of the disclosure.
Figure 7B:
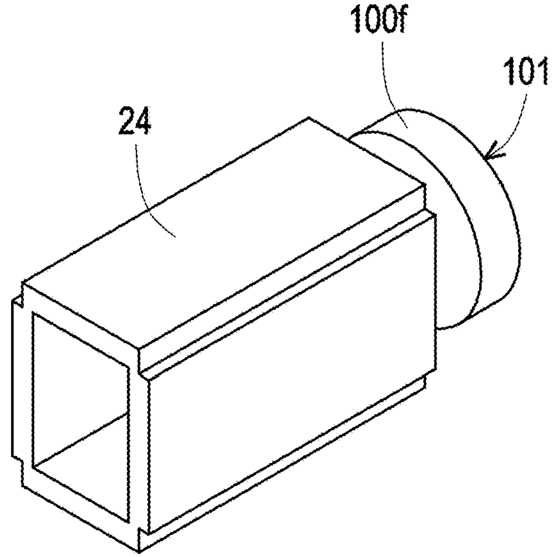
FIG. 7B is a schematic three-dimensional view of FIG. 7A from another viewing angle.
Figure 7C:
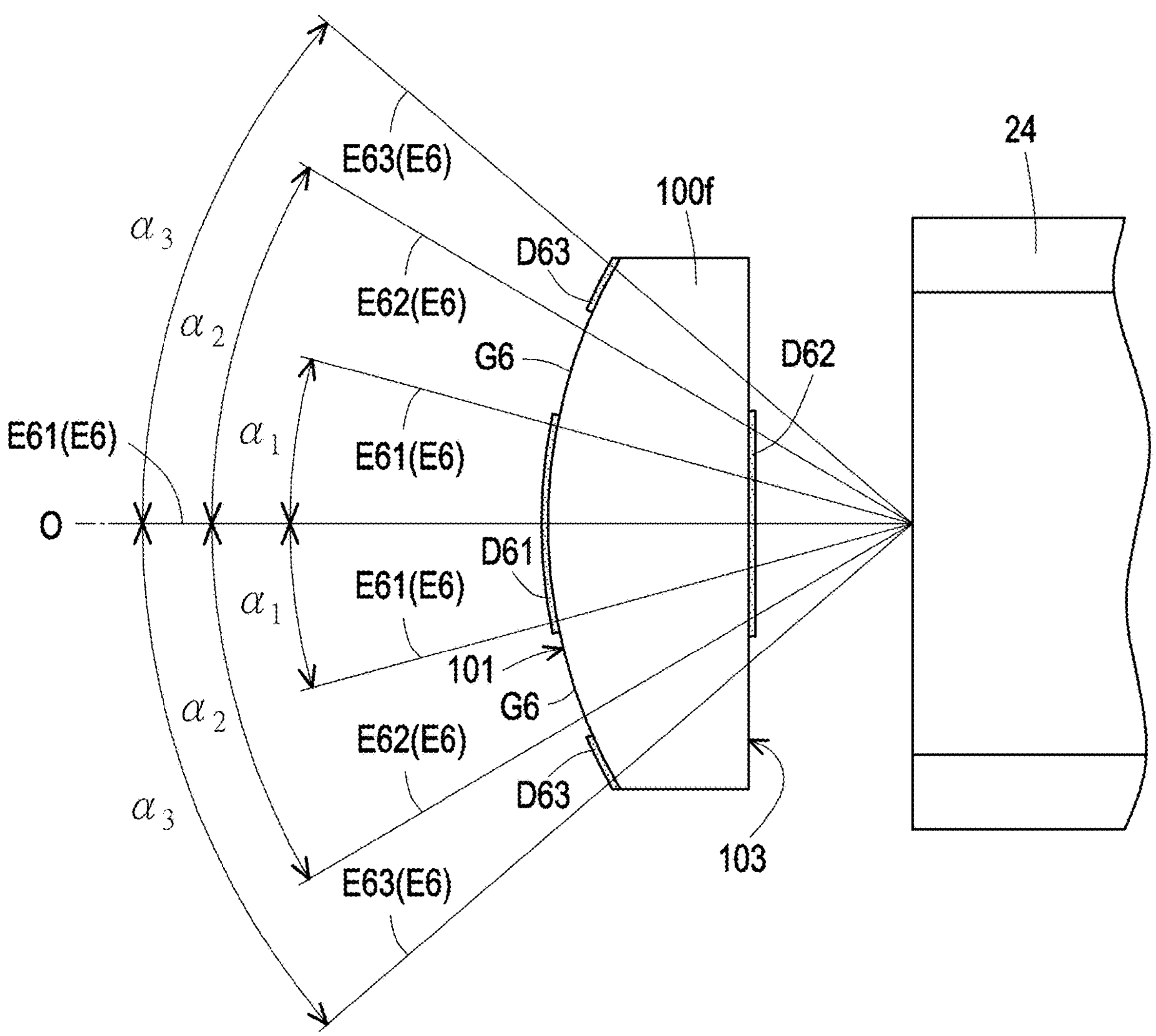
FIG. 7C is a schematic diagram of a light beam entering FIG. 7A.

FIG. 7A is a schematic three-dimensional view of relative positions of an optical diffusion assembly and a light uniformizing element according to another embodiment of the disclosure. FIG. 7B is a schematic three-dimensional view of FIG. 7A from another viewing angle. FIG. 7C is a schematic diagram of a light beam entering FIG. 7A. Referring to FIG. 2A, FIG. 2B, FIG. 7A and FIG. 7B at the same time, an optical diffusion element 100*f* of the embodiment is similar to the optical diffusion assembly 100*a* in FIG. 2A, and a main difference there between is that in this embodiment, the optical diffusion element 100*f* is embodied as a plano-convex condenser lens, which has a first surface 101 and a second surface 103 opposite to each other. Namely, in the embodiment, no diffuser is provided.

In detail, referring to FIG. 7A, FIG. 7B and FIG. 7C, the first surface 101 of the optical diffusion element 100*f* has a first diffusion region D61, and the second surface 103 of the optical diffusion element 100*f* has a second diffusion region D62. The first surface 101 is embodied as a convex surface of the plano-convex condenser lens, and the second surface 103 is embodied as a plane of the plano-convex condenser lens. The first diffusion region D61 and the second diffusion region D62 are located on a central optical axis O of a light beam E6. The first surface 101 of the optical diffusion element 100*f* further has a third diffusion region D63, wherein there is a gap G6 between the first diffusion region D61 and the third diffusion region D63. Preferably, a sum of areas of the first diffusion region D61 and the third diffusion region D63 is greater than an area of the second diffusion region D62. A haze of the second diffusion region D62 is greater than a haze of the first diffusion region D61. Here, the haze of the first diffusion region D61 and the haze of the third diffusion region D63 are the same.

Referring to FIG. 7C, in the embodiment, a first part E61 of a light beam E6 has the incident angle α1, for example, 0 to 15 degrees, which may sequentially pass through the first diffusion region D61 and the second diffusion region D62, i.e. pass through two different hazes, where a diffusion angle of the first part E61 of the light beam E6 passing through the first diffusion region D61 is, for example, 1.5 degrees, a diffusion angle of the first part E61 of the light beam E6 passing through the second diffusion region D62 is, for example, 2.5 degrees, which may generate the output light with a diffusion angle of 4.0 degrees. The second part E62 of the light beam E6 has the incident angle α2, for example, 30°, which sequentially passes through the gap G6 and the second diffusion region D62, i.e. only passes through one haze to generate the output light with a diffusion angle of 2.5 degrees. The third part E63 of the light beam E6 has the incident angle α3, for example 40 degrees, which passes through the third diffusion regions D63 and does not pass through the second diffusion region D62, i.e., only passes through one haze, wherein the third part E63 of the light beam E6 passes through the third diffusion region D63 to generate the output light with a diffusion angle of 1.5 degrees.

In summary, the embodiments of the disclosure have at least one of the following advantages or effects. In the design of the optical diffusion assembly of the disclosure, the first surface of the first optical body or the third surface of the second optical body has the first diffusion region, and the fourth surface of the second optical body has the second diffusion region, where the first diffusion region and the second diffusion region are located on the central optical axis of the light beam, and the orthogonal projection of the first diffusion region on the fourth surface of the second optical body is overlapped with and greater than the orthogonal projection of the second diffusion region on the fourth surface of the second optical body. The first part of the light beam sequentially passes through the first diffusion region and the second diffusion region, and the second part of the light beam passes through the first diffusion region and does not pass through the second diffusion region. By the setting of the first diffusion region and the second diffusion region, the incident light beam of different angles may pass through different diffusion regions. Therefore, in addition to different parts of the light beam having different diffusion effects (for example, allowing the diffusion effects to be superimposed to generate light with different diffusion degrees), it may also reduce the energy loss of the overall incident light beam entering the optical diffusion assembly. In addition, the projection device using the optical diffusion assembly of the disclosure may improve the optical path efficiency and reliability of the optical engine module, reduce a volume of the optical engine module, and enhance flexibility of optical path design of the optical engine module, and has better projection quality and product competitiveness.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the disclosure” does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An optical diffusion assembly, disposed on a transmission path of a light beam, wherein the optical diffusion assembly comprises a first optical body and a second optical body, the light beam sequentially passes through the first optical body and the second optical body, the first optical body has a first surface and a second surface opposite to each other, the second optical body has a third surface and a fourth surface opposite to each other, the first surface or the third surface has a first diffusion region, the fourth surface has a second diffusion region, the first diffusion region and the second diffusion region are located on a central optical axis of the light beam, a first part of the light beam sequentially passes through the first diffusion region and the second diffusion region, a second part of the light beam passes through the first diffusion region and does not pass through the second diffusion region, and an orthogonal projection of the first diffusion region on the fourth surface of the second optical body is overlapped with and greater than an orthogonal projection of the second diffusion region on the fourth surface of the second optical body.

2. The optical diffusion assembly according to claim 1, wherein the second optical body is a plate-shaped or disc-shaped diffusion element, the third surface has the first diffusion region, the fourth surface further has two third diffusion regions, the second diffusion region is located between the two third diffusion regions, there is a gap between any one of the two third diffusion regions and the second diffusion region, the second part of the light beam sequentially passes through the first diffusion region and the gap, and a third part of the light beam passes through at least one of the two third diffusion regions and does not pass through the first diffusion region.

3. The optical diffusion assembly according to claim 2, wherein an area of the first diffusion region is smaller than a sum of areas of the second diffusion region and the two third diffusion regions, and a haze of the first diffusion region is greater than a haze of the second diffusion region and a haze of the two third diffusion regions.

4. The optical diffusion assembly according to claim 2, wherein a haze of the second diffusion region is the same as a haze of the two third diffusion regions.

5. The optical diffusion assembly according to claim 1, wherein the second optical body is a disc-shaped diffusion element, the third surface has the first diffusion region, the fourth surface further has two third diffusion regions, the second diffusion region is located between the two third diffusion regions, the second diffusion region and the two third diffusion regions are arranged adjacent to each other without gaps, the second part of the light beam sequentially passes through the first diffusion region and at least one of the two third diffusion regions, and a third part of the light beam only passes through the first diffusion region and does not pass through the second diffusion region and the two third diffusion regions.

6. The optical diffusion assembly according to claim 5, wherein an area of the first diffusion region is greater than a sum of areas of the second diffusion region and the two third diffusion regions, and a haze of the second diffusion region is greater than a haze of the first diffusion region and a haze of the two third diffusion regions.

7. The optical diffusion assembly according to claim 5, wherein a haze of the first diffusion region and a haze of the two third diffusion region are the same.

8. The optical diffusion assembly according to claim 1, wherein the second optical body is a disc-shaped diffusion element with diffusion particles, the third surface has a part of the first diffusion region, the fourth surface further has two third diffusion regions, the second diffusion region is located between the two third diffusion regions, and a haze of the second diffusion region is different from a haze of the two third diffusion regions and a haze of the first diffusion region.

9. The optical diffusion assembly according to claim 1, wherein the first optical body is a plano-convex condenser lens, the second optical body is a disc-shaped diffusion element, the first surface has the first diffusion region, the fourth surface further has two third diffusion regions, the second diffusion region is located between the two third diffusion regions, there is a gap between any one of the two third diffusion regions and the second diffusion region, the second part of the light beam sequentially passes through the first diffusion region and the gap, and a third part of the light beam passes through at least one of the two third diffusion regions and does not pass through the first diffusion region.

10. The optical diffusion assembly according to claim 9, wherein an area of the first diffusion region is smaller than a sum of areas of the second diffusion region and the two third diffusion regions, and a haze of the first diffusion region is greater than a haze of the second diffusion region and a haze of the two third diffusion regions.

11. The optical diffusion assembly according to claim 9, wherein a haze of the second diffusion region and a haze of the two third diffusion regions are the same.

12. The optical diffusion assembly according to claim 9, wherein the first surface is a convex surface of the plano-convex condenser lens.

13. An optical diffusion element, arranged on a transmission path of a light beam, wherein the optical diffusion element is a plano-convex condenser lens, the plano-convex condenser lens has a first surface and a second surface opposite to each other, the first surface has a first diffusion region, the second surface has a second diffusion region, the first diffusion region and the second diffusion region are located on a central optical axis of the light beam, the first surface further has a third diffusion region, there is a gap between the first diffusion region and the third diffusion region, a first part of the light beam sequentially passes through the first diffusion region and the second diffusion region, and a second part of the light beam sequentially passes through the gap and the second diffusion region.

14. The optical diffusion element according to claim 13, wherein a sum of areas of the first diffusion region and the third diffusion region is greater than an area of the second diffusion region, and a haze of the second diffusion region is greater than a haze of the first diffusion region.

15. The optical diffusion element according to claim 13, wherein a haze of the first diffusion region is the same as a haze of the third diffusion region.

16. The optical diffusion element according to claim 13, wherein the first surface is a convex surface of the plano-convex condenser lens, and the second surface is a plane of the plano-convex condenser lens.

17. A projection device, comprising: an illumination system, an optical engine module, and a lens, wherein, the illumination system is adapted to provide an illumination beam and comprises a light source, an optical diffusion assembly, and a light uniformizing element, the light source is adapted to provide a light beam, the optical diffusion assembly is disposed a transmission path of the light beam and comprises a first optical body and a second optical body, the light beam sequentially passes through the first optical body and the second optical body, the first optical body has a first surface and a second surface opposite to each other, the second optical body has a third surface and a fourth surface opposite to each other, the first surface or the third surface has a first diffusion region, the fourth surface has a second diffusion region, the first diffusion region and the second diffusion region are located on a central optical axis of the light beam, a first part of the light beam sequentially passes through the first diffusion region and the second diffusion region, a second part of the light beam passes through the first diffusion region and does not pass through the second diffusion region, an orthogonal projection of the first diffusion region on the fourth surface of the second optical body is overlapped with and greater than an orthogonal projection of the second diffusion region on the fourth surface of the second optical body, the light uniformizing element is disposed on the transmission path of the light beam transmitted by the optical diffusion assembly and is configured to form the illumination beam, the optical engine module is disposed on a transmission path of the illumination beam and comprises a light valve module and an optical prism disposed on the transmission path of the illumination beam and configured to guide the illumination beam to the light valve module and guide an image beam from the light valve module, and the lens is disposed on a transmission path of the image beam and is configured to project the image beam out of the projection device.

18. The projection device according to claim 17, wherein the second optical body is a plate-shaped or disc-shaped diffusion element, the third surface has the first diffusion region, the fourth surface further has two third diffusion regions, the second diffusion region is located between the two third diffusion regions, there is a gap between any one of the two third diffusion regions and the second diffusion region, the second part of the light beam sequentially passes through the first diffusion region and the gap, and a third part of the light beam passes through at least one of the two third diffusion regions and does not pass through the first diffusion region.

19. The projection device according to claim 17, wherein the second optical body is a disc-shaped diffusion element, the third surface has the first diffusion region, the fourth surface further has two third diffusion regions, the second diffusion region is located between the two third diffusion regions, the second diffusion region and the two third diffusion regions are arranged adjacent to each other without gaps, the second part of the light beam sequentially passes through the first diffusion region and at least one of the two third diffusion regions, and a third part of the light beam only passes through the first diffusion region and does not pass through the second diffusion region and the two third diffusion regions.

20. The projection device according to claim 17, wherein the first optical body is a plano-convex condenser lens, the second optical body is a disc-shaped diffusion element, the first surface has the first diffusion region, the fourth surface further has two third diffusion regions, the second diffusion region is located between the two third diffusion regions, there is a gap between any one of the two third diffusion regions and the second diffusion region, the second part of the light beam sequentially passes through the first diffusion region and the gap, and a third part of the light beam passes through at least one of the two third diffusion regions and does not pass through the first diffusion region.

21. The projection device according to claim 17, wherein the second optical body is a disc-shaped diffusion element with diffusion particles, the third surface has a part of the first diffusion region, the fourth surface further has two third diffusion regions, the second diffusion region is located between the two third diffusion regions, and a haze of the second diffusion region is different from a haze of the two third diffusion regions and a haze of the first diffusion region.

22. A projection device, comprising: an illumination system, an optical engine module, and a lens, wherein the illumination system is adapted to provide an illumination beam and comprises a light source, an optical diffusion element, and a light uniformizing element, the light source is adapted to provide a light beam, the optical diffusion element is disposed a transmission path of the light beam and is a plano-convex condenser lens, the plano-convex condenser lens has a first surface and a second surface opposite to each other, the first surface has a first diffusion region, the second surface has a second diffusion region, the first diffusion region and the second diffusion region are located on a central optical axis of the light beam, the first surface further has a third diffusion region, there is a gap between the first diffusion region and the third diffusion region, a first part of the light beam sequentially passes through the first diffusion region and the second diffusion region, a second part of the light beam sequentially passes through the gap and the second diffusion region, the light uniformizing element is disposed on the transmission path of the light beam transmitted by the optical diffusion element and is configured to form the illumination beam, the optical engine module is disposed on a transmission path of the illumination beam and comprises a light valve module and an optical prism disposed on the transmission path of the illumination beam and configured to guide the illumination beam to the light valve module and guide an image beam from the light valve module, and the lens is disposed on a transmission path of the image beam and is configured to project the image beam out of the projection device.

* * * * *